(12) United States Patent
Syeda-Mahmood

(10) Patent No.: US 6,691,126 B1
(45) Date of Patent: Feb. 10, 2004

(54) METHOD AND APPARATUS FOR LOCATING MULTI-REGION OBJECTS IN AN IMAGE OR VIDEO DATABASE

(75) Inventor: Tanveer Fathima Syeda-Mahmood, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 586 days.

(21) Appl. No.: 09/593,465

(22) Filed: Jun. 14, 2000

(51) Int. Cl.$^7$ .............................................. G06F 17/30
(52) U.S. Cl. ..................................... 707/102; 382/104
(58) Field of Search ........................... 707/102; 382/104

(56) References Cited

U.S. PATENT DOCUMENTS

| | | | | |
|---|---|---|---|---|
| 5,161,204 A | * | 11/1992 | Hutcheson et al. | 382/157 |
| 5,579,444 A | * | 11/1996 | Dalziel et al. | 700/259 |
| 5,836,872 A | * | 11/1998 | Kenet et al. | 600/306 |
| 5,953,451 A | * | 9/1999 | Syeda-Mahmood | 382/187 |
| 5,987,459 A | * | 11/1999 | Swanson et al. | 707/6 |
| 6,108,444 A | * | 8/2000 | Syeda-Mahmood | 382/186 |
| 6,141,041 A | * | 10/2000 | Carlbom et al. | 348/169 |
| 6,266,442 B1 | * | 7/2001 | Laumeyer et al. | 382/190 |
| 6,282,299 B1 | * | 8/2001 | Tewfik et al. | 382/100 |
| 6,321,232 B1 | * | 11/2001 | Syeda-Mahmood | 707/104.1 |
| 6,363,161 B2 | * | 3/2002 | Laumeyer et al. | 382/104 |
| 6,366,701 B1 | * | 4/2002 | Chalom et al. | 382/236 |
| 6,441,846 B1 | * | 8/2002 | Carlbom et al. | 348/169 |

\* cited by examiner

*Primary Examiner*—Wayne Amsbury
(74) *Attorney, Agent, or Firm*—Alison Motinger, Esq.; McGinn & Gibb, PLLC

(57) ABSTRACT

A method (and system) for specifying the region layout of objects in an affine invariant manner as a set of affine intervals between pairs of regions, includes representing database and query regions using affine intervals along with their region identity, matching query region layout to layout of database image regions using an index structure, and retrieving relevant images of the database by hashing for dominant hit regions in the index structure.

25 Claims, 18 Drawing Sheets

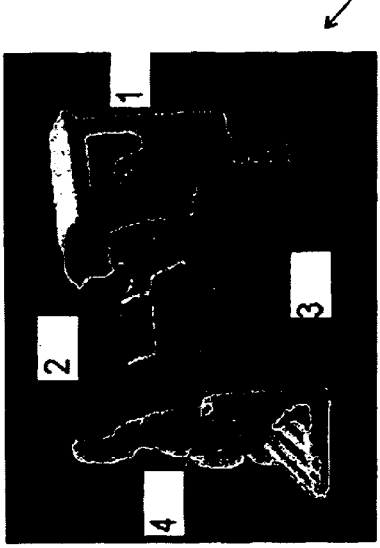
FIG. 4E (4,2,1.82)(2,4,0.72)(2,3,0.58)
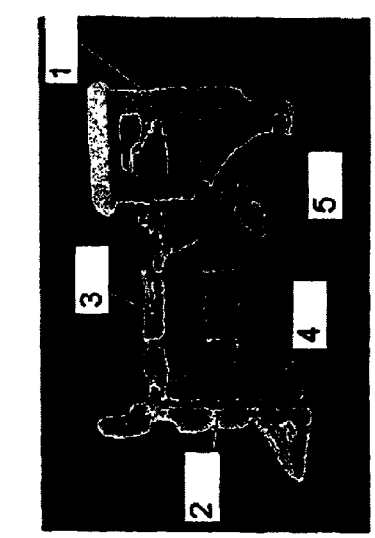
FIG. 4D
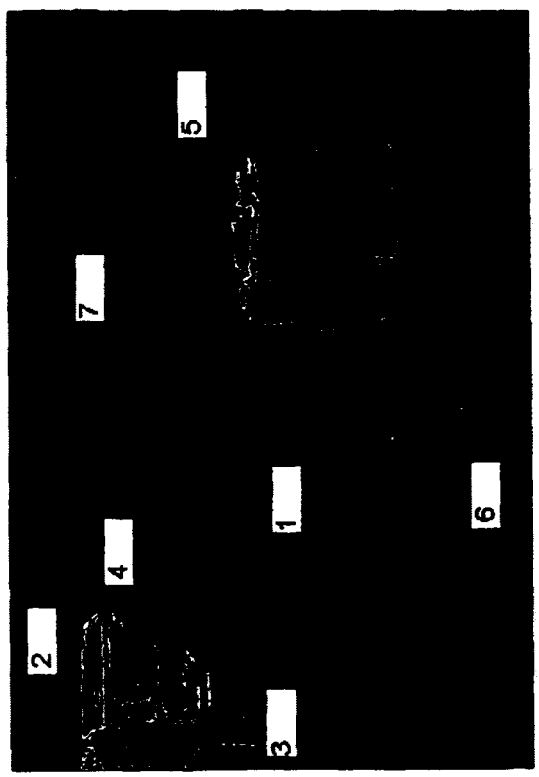
Hash region pairs through IHT matching
FIG. 4F (4,3,1.34)(4,4,1.3)(3,1,0.69)

METHOD AND APPARATUS FOR LOCATING MULTI-REGION OBJECTS IN AN IMAGE OR VIDEO DATABASE

CROSS-REFERENCE TO RELATED APPLICATION

The present application is related to U.S. patent application Ser. No. 09/593,131, filed on Jun. 14, 2000, to T. Syeda-Mahmood et al., entitled "METHOD AND APPARATUS FOR REPRESENTING DATABASE AND QUERY INFORMATION USING INTERVAL HASH TREE", assigned to the present assignee, and incorporated herein by reference.

BACKGROUND OF THE INVENTION

1. Field of the Invention

The present invention generally relates to a method and system for locating a multi-region object in an image or a video database.

2. Description of the Related Art

A challenging problem of content-based retrieval is the retrieval of images or video clips depicting visual patterns or objects. Such localization of images and regions in images containing objects is useful in a number of applications. For example, when the object to be localized is a 2-dimensional (2D) slide pattern representing a projected transparency, such localization can be used for the synchronization of slides and video. This makes for ease of browsing of long videos using slides as reference points.

Similarly, retrieval of images containing objects can allow a more advanced yet natural way of querying the database such as for the detection of similar trademarks. Frequently, the objects depicted in images are composed of multi-colored regions. In the case of slides or transparencies for example, the background region serves as the colored backdrop in which several multi-colored text or graphics regions may lie.

Thus, localization of regions in images that are likely to contain a given object is an essential problem in object recognition and image indexing of databases It has been shown that such region selection can significantly reduce the search involved in object recognition by ranking and focusing the search for an object on likely candidate regions in image.

Region localization is also a key aspect of image indexing of databases, where it is desirable to quickly localize an object query without doing a detailed search of either the image database or regions within images. Often, the objects that need to be localized possess interesting regions such as color regions, whose layout also characterizes object shape in a distinctive manner. It therefore, seems reasonable to use both layout information to perform object localization and matching.

Even though querying based on colored objects seems so natural and straight-forward, it is actually a very difficult problem for the following reasons.

That is, because of the different imaging conditions that include illumination changes, occlusions, and scene clutter, the same object or pattern can appear very different in any image. Further, in many applications, robust localization is desirable even when the object appears in a different pose. Finally, in a large database of images or videos, one cannot afford to search the entire collection. Instead, an "index" of the images is needed for the object to be created, so that only the relevant images or videos that are likely to contain the object are searched.

A few attempts have been made in the past to address this problem. These approaches have two parts, one in which they isolate color regions, and a second one in which they reason about the layout of color regions. The color region information is often described through local color histograms [Das et al, CVPR 98, Matas et al., ICCV95], or by performing a complete bottom-up color image segmentation [Syeda-Mahmood, Proc. ECCV'92]. The predominant way of capturing layout information is through graphs, such as region adjacency graphs[Syeda-Mahmood, Proc. ECCV '92], color adjacency graphs[Matas, Proc. ICCV 95], spatial proximity graphs [Das et al. CVPR 97], etc. Region localization is then achieved by a variant of subgraph matching using the color of the regions as a first filter, followed by layout constraints such as adjacencies as a second-level filter.

A desirable object localization must be fast, and must account for changes in imaging conditions including appearance changes, illumination changes, occlusions and presence of distractors.

Prior to the present invention, none of the region localization methods mentioned above, has met these challenging requirements. They fail either because of the color region detection and matching being inaccurate, or by inaccurately capturing spatial layout through approximate representations such as proximity layout graphs.

Bottom-up color segmentations give a large number of spurious color regions, while color histograms are sensitive to changes in appearance and illumination. These cause problems in spatial interpretation, when adjacent object regions visually appear adjacent in the image but are not adjacent based on color segmentation.

Region adjacency graphs representations, on the other hand, require more or less accurate segmentation, and since they use subgraph matching, they can become computationally prohibitive even for images with small number of regions.

Thus, while it is desirable to query objects in a database using their color and spatial layout, there exists no technique that can do so in a way that is robust to changes in pose, occlusions, and color changes of objects. Further, these techniques do not support the indexing of spatial layout with the result that all images of a database may have to be examined.

SUMMARY OF THE INVENTION

In view of the foregoing and other problems, disadvantages, and drawbacks of the conventional methods and structures, an object of the present invention is to provide a method and structure in which objects can be represented by the spatial layout of their regions in a pose-invariant fashion.

Another object is to provide a method and system for locating multi-colored objects in a database of unsegmented images or video frames using the color and positional arrangement of regions on the object.

Yet another object of the invention is to develop a robust method of object localization that is illumination and pose-invariant as well as tolerant to occlusions and scene clutter.

In a first aspect, a method of locating a multi-featured object in an image or video database is presented that includes identifying the relevant images and the regions within images that are likely to contain a multi-featured query object using a combination of color and geometric layout in an illumination and affine-invariant manner.

Further, the technique presented supports indexing of the database so as to avoid a detailed search of every image of the database.

With the unique and unobvious features of the present invention, a method and system are provided for robustly localizing a multi-colored object or pattern in a database of images (or video clips). The colors on the object or images are described using an illumination and pose-invariant color descriptor. The layout of colored regions is described as a region affine structure by using affine-intervals between pairs of regions on the object. The resulting color and shape layout information on images is represented in a compact and efficient data structure called an "interval hash tree" The interval hash tree data structure is a general index structure for representing a set of overlapping rectangles, and has been disclosed in the above-mentioned related U.S. patent application Ser. No. 09/593,131, incorporated herein by reference. The present invention makes use of this data structure to represent affine intervals which are rectangles.

A key feature of the invention lies in the modeling of spatial layout of regions on objects in an affine-invariant fashion, and in the development of the technique of region hashing for the robust localization of multi-colored objects in a way that advantageously accounts for changes due to illumination, pose changes and occlusions of objects, and the presence of scene clutter. The indexing present in region hashing also provides for direct localization of relevant images and regions within images containing the object without incurring a detailed search.

BRIEF DESCRIPTION OF THE DRAWINGS

The foregoing and other objects, aspects and advantages will be better understood from the following detailed description of a preferred embodiment of the invention with reference to the drawings, in which:

FIGS. 3A–3C illustrates the problem of matching object query to its instance in a database image using the affine interval representation of the query object and the image, wherein FIG. 3A illustrates database object in terms of its regions and their layout modeled through affine intervals (shown using region 1 as reference), FIG. 3B illustrates a query object in terms of its regions, and their layout modeled through affine intervals computed using region 1 on the query object as reference, and FIG. 3C illustrates the matching problem as that of finding the overlap between the two sets of intervals.

FIGS. 4D–4F are the regions in the images detected using color alone. The result of object indexing in these images is shown through the resulting region correspondences and their scores produced during region hashing.

FIG. 8A illustrates regions in an example object;

FIG. 8B illustrates overlapping windows, and more particularly the affine intervals (rectangles) of the spatial layout of all regions with respect to region 1 using the middle basis triple from those on the boundary curve of region 1e; and FIG. 8C illustrates an interval hash tree for the rectangles in FIG. 8B.

DETAILED DESCRIPTION OF PREFERRED EMBODIMENTS OF THE INVENTION

Figures 1A, 1B:
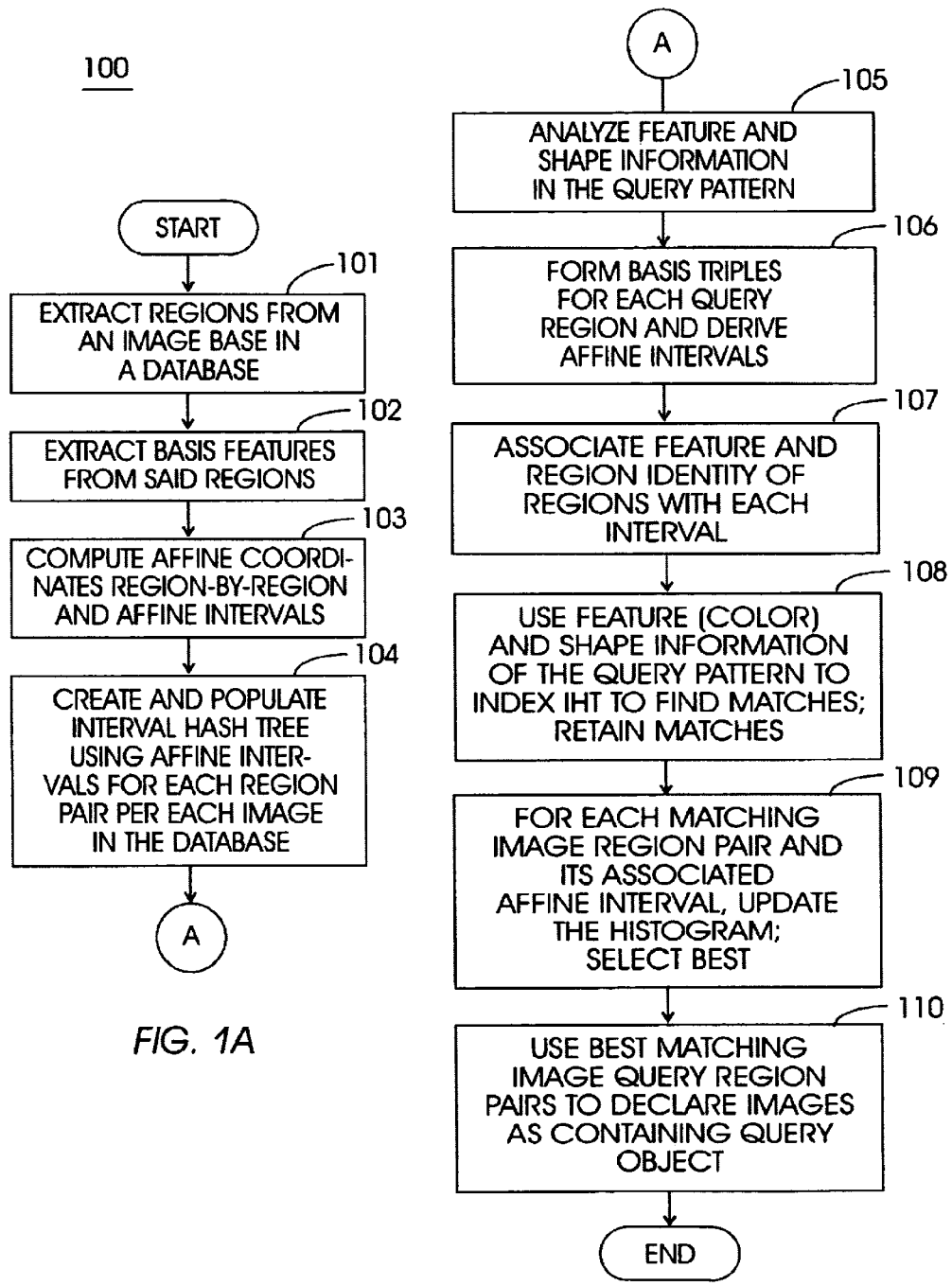
FIGS. 1A–1C illustrate a method 100 of locating multi-featured (e.g., color) objects in an image or a video database according to the present invention, with FIG. 1A illustrating an "off-line" portion of the method, FIG. 1B illustrating an "on-line" ("live" portion of the inventive method), and FIG. 1C illustrating a method 200 of detecting color regions according to the present invention.

Referring now to the drawings, and more particularly to FIGS. 1–8C, there are shown preferred embodiments of the method and structures according to the present invention.

Generally, the present invention provides a method which addresses the problem of localizing multi-region objects in a database of images through a technique called region hashing. The regions on the object can be obtained using various types of region detection mechanisms. For example, if a color detector is used, the regions of the object being referred to are the color regions. Similarly, if the regions are extracted using texture information, then the method can also be applied to locate an object specified by texture regions. The layout of the regions so detected is represented using a novel shape representation called affine interval structure. To allow efficient indexing of the spatial structure, the affine intervals are represented in a suitable data structure called the interval hash tree. The interval hash tree is a two-way interval tree for storing a set of database rectangles and is disclosed in the above-mentioned U.S. patent application Ser. No. 09/593,131, incorporated herein by reference. Since the affine intervals are rectangles, this data structure is suitable for storing the affine interval information. Region hashing is then based on the principle of affine-invariance of affine intervals.

That is, if a query object is present in an image of the database, and is possibly depicted under a different pose, the affine intervals computed from the regions within the query will match or overlap with the affine intervals computed from the regions within the query-containing area in the image. This is determined by indexing the data structure (interval hash tree) with the query affine intervals. The matching image regions likely to contain the query object are indicated by the dominant peaks of a histogram of the regions "hit" by the indexing process. Although other data structures could be used to organize the affine intervals of the images of the database, the interval hash tree provides a definite advantage in terms of efficiency.

The method presented in this invention has several advantages. First, because it models the spatial layout of regions on objects through affine intervals, it enables query localization in an image database under changes in pose. Secondly, by using the interval hash tree as an index structure, it avoids linear search of the database in determining the matching images containing a query. Third, by computing the affine intervals of region pairs with respect to multiple basis features on regions, the technique has a built-in redundancy to allow tolerance to occlusions and noise. Finally, by relying on an illumination-invariant color descriptor disclosed in the above-mentioned related U.S. patent application Ser. No. 09/593,131, incorporated herein by reference, the technique can enable the extraction and matching of regions in an illumination-invariant fashion. The localization of objects is essentially treated as a two-step operation, as shown in FIGS. 1A–1B.

As described in further detail below and referring to FIG. 1A, the first operation is applied in an off-line fashion to images of a database. In case the database is of video clips, similar processing can be applied to video frames (or keyframes for efficiency purposes). A compact and indexable representation of color and shape information of the database is then produced and represented in a data structure such as the interval hash tree. The second operation, as illustrated in FIG. 1B, is performed "live" and on-line (i.e., a query object is analyzed in an identical fashion for color and layout information). This information, however, is used to index the database using a technique called "region hashing" to directly identify collection of image regions and images of the database that are likely to contain the object. The details of both operations are described below.

Returning to FIGS. 1A–1B, the first and second operations of the color region hashing method of the invention, can be summarized as follows into a first, off-line operation and a second, on-line ("live") operation.

Off-line Operations:

Step 101: Given a database of unsegmented images, the first step is to extract regions from images. Depending on the feature used, the extraction of regions can be performed using different mechanisms. If the regions desired are color regions, a previously disclosed method of extracting color regions based on an illumination-invariant color descriptor for a set of surface color classes, can be used. When the number of surface color classes are large, this can essentially create a segmentation of the scene. Each such region can be associated with a pair of ids <RC,I> where RC is the region color and I the image number that contains the region. Although the method of extraction of color regions using an illumination-invariant descriptor has been disclosed in the above-mentioned related U.S. patent application No. 09/593,131, incorporated herein by reference, it is also included below for completeness.

MODELING COLORS OF REGIONS

The goal of modeling colors of regions is to ensure that it remains stable with respect to illumination changes, so that regions on the object can be detected robustly in any image of the database when present.

Generally, a color region in an image arises from an object surface. Using the image irradiance equation, the light falling on the image $f(\lambda, r)$ can be to the physical properties of the scene being imaged as $$I(\lambda, r) = \rho(\lambda, r) F(r) E(\lambda) \quad (1)$$

where $\rho$ is the surface reflectance function, $F(r)$ is the component that depends on surface geometry, and $E(\lambda)$ is the intensity of the ambient illumination. Here, a simpler approximation to the image irradiance equation is considered in which the spectral distribution of the illuminant is assumed to be spatially invariant over the surface.

The surface reflectance and hence the resulting appearance of a surface is determined by the composition, as well as the concentration, of the pigments of the material constituting the surface. For most surfaces, the composition of the pigments can be considered independent of their concentration so that spectral reflectance $\rho(\lambda, r)$ of the surface can be written as a product of two terms $\rho_1(\lambda)$ and $\rho_2(r)$. The resulting image irradiance equation becomes:

$$I(\lambda, r) = \rho_1(\lambda)\rho_2(r)F(r)E(\lambda) = H(r)L(\lambda) \quad (2)$$

Since the spectral reflectance function $\rho_2(\lambda)$ is independent of illumination and spatial distribution of reflectance, it can serve as an illumination-invariant and pose-invariant descriptor. However, it cannot be directly recovered from the image irradiance equation alone. An equivalent representation of the spectral reflectance component can be obtained by projection in a suitable color space. In particular, the image intensity is filtered along three color channels (e.g., red, green and blue (RGB) channels), specified using a triple $(I_j(r), j=1,2,3)$ as $$I_j(r) = \int^\infty I(\lambda, r) h_j(\lambda) d\lambda = H(r) \int^\infty L(\lambda) h_j(\lambda) d\lambda \quad (3)$$

where $h_1(\lambda)$, $h_2(\lambda)$, and $h_3(\lambda)$ are the transfer functions of the channels.

Since perceptually uniform color spaces are known to be more stable for representing color than the traditional RGB space, in a preferred embodiment, a luminance-chrominance color space called the YES space was selected, which can be derived from RGB space as $(I_y(r), I_E(r), I_s(r))$ where $I_y(r) = \Sigma_i K_{yi} I_i(r)$, $I_E(r) = \Sigma_i K_{Ei} I_i(r)$, and $I_s(r) = \Sigma_i K_{si} I_i(r)$, where $(K_{Y1}, K_{Y2}, K_{Y3}) = (0.253, 0.684, 0.063)$, $(K_{E1}, K_{E2}, K_{E3}) = (0.5, -0.5, 0.0)$, and $(K_{S1}, K_{S2}, K_{S3}) = (0.25, 0.25, -OS)$.

It was shown in [8], that most of the color variations across a surface are due to intensity. A certain amount of tolerance to changes in surface geometry due to pose changes, can therefore, be achieved by factoring out the luminance component to form a 2D color space.

For lambertian surfaces, the image irradiance clusters in the resulting 2D color space show more or less an elliptic shape and a strong directional component. Such clusters can therefore be completely specified through their location, spread (size), and orientation by their mean, eigenvalues and eigenvectors, respectively. In particular, the direction of the cluster is a ratio of spectral responses, and is an illumination and pose-invariant color descriptor.

While the direction of the cluster is independent of object pose and ambient illumination, it can be shown that its location and spread is a function of both pose and illumination. Thus, under pose and illumination changes, the clusters from different instances of the surface undergo translation and shear, but not a change in orientation.

Detection of Color Regions

Using the above formulation, an image region corresponds to an object's colored surface if the orientation of their clusters match. However, when locating such regions is desirable, some method is required for selecting candidate regions for consideration.

The traditional way to avoid this problem has been to do an inference on uniform-shaped regions (e.g., rectangular, or circular) obtained by a regular division of the image. With this kind of regular division, errors in inference can be made due to merging of adjacent regions of different color at the region boundaries.

The invention in U.S. patent application No. 09/593,131, took a different approach by representing a colored surface by a set of representative clusters corresponding to projections of the colored surface under a few well-chosen illumination sources and surface orientations. The set of surfaces of interest and their appearances under various imaging conditions can be manually acquired in a training stage, and the resulting representation of colored surfaces can be denoted by a surface color code book as $$\text{Codebook} = \{(C_i, M_i, A_j, \lambda_i, r_i) | 1 \leq i \leq S\} \quad (6)$$

where S is the total number of clusters, $C_i$ is the surface identifier of cluster i, $M_i$ is its centroid, $A_j$ is the covariance matrix of the cluster, and $\lambda_i$ and $r_i$ are its eigenvalues and eigenvectors, respectively.

Figure 1C:
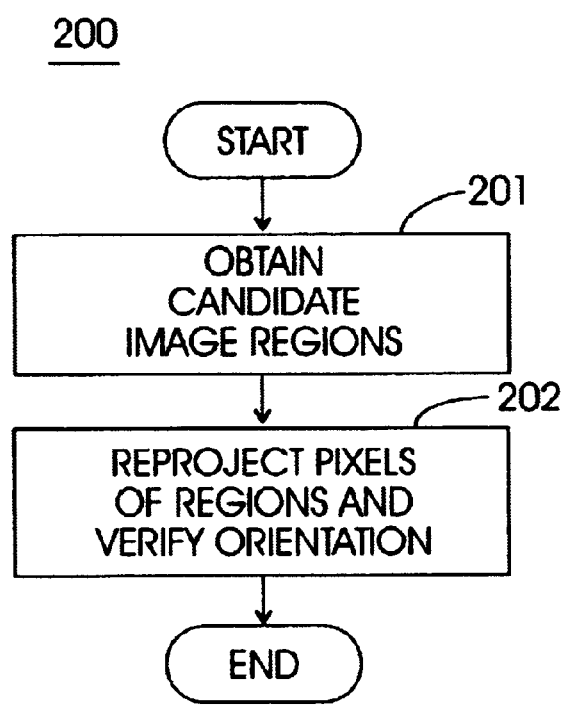

The method for color region detection includes essentially two steps, as shown in FIG. 1C. In the first step, candidate image regions that match a surface cluster based on distance alone are obtained, by finding the nearest surface cluster to the color of an image pixel and assigning the corresponding surface label to the pixels, and grouping image pixels of the same label.

In the second step, the pixels of regions so obtained are then re-projected in color space and the orientation of the resulting cluster in color space is verified for a match with the orientation of the cluster whose surface label was assigned to the region in the previous step.

The first step thus ensures a match of the regions to some appearance of a surface, while the second step ensures a spectral match of the regions. Using this method, multiple assignments of pixels to surface clusters are possible, but these are often eliminated in a later smoothing operation, that removes small holes with regions. The end result is a clean detection of the desired surfaces in the image. Examples of such detection are provided below.

All regions belonging to known colored surfaces in the images of the database can be detected using the above method/algorithm during the database creation stage through efficient algorithms.

For example, an exemplary version implemented by the present inventor can detect regions belonging to a single colored surface class in a database of 500 images in 30 seconds. The surface color label uniquely identifies the color of the regions, and this is used in combination with spatial layout described below.

Step 102: In this step, the spatial layout of the extracted regions is modeled using affine intervals. Without modeling the spatial layout of regions on objects, it becomes difficult to robustly localize the objects. For example, if the regions on an object were specified in terms of only color, several potential false matches are possible. This is illustrated in FIGS. 4D–4F where using the two of the colors on the object shown in FIG. 4D, spurious matches results in the image of FIG. 4F. To more accurately localize an object, it is essential to exploit the spatial arrangement of color regions.

As mentioned earlier, methods based on region adjacency graphs can not only be inaccurate in modeling spatial layout, but also incur a huge complexity during subgraph matching to find the set of corresponding regions. Since the goal of object localization is to help in the recognition of query within selected regions in images, it is sufficient if at least one pair of "correct" corresponding image and object regions are detected for each object occurrence. However, in practice, to avoid false negatives, a ranking of the region pairs is more useful.

Since incorrect pairing can focus the search for the object in incorrect locations and cause needless search, the image-object region pair is preferably chosen based on evidence provided for the spatial arrangement of as many object regions within image regions as is possible under occlusions.

Figure 2A:
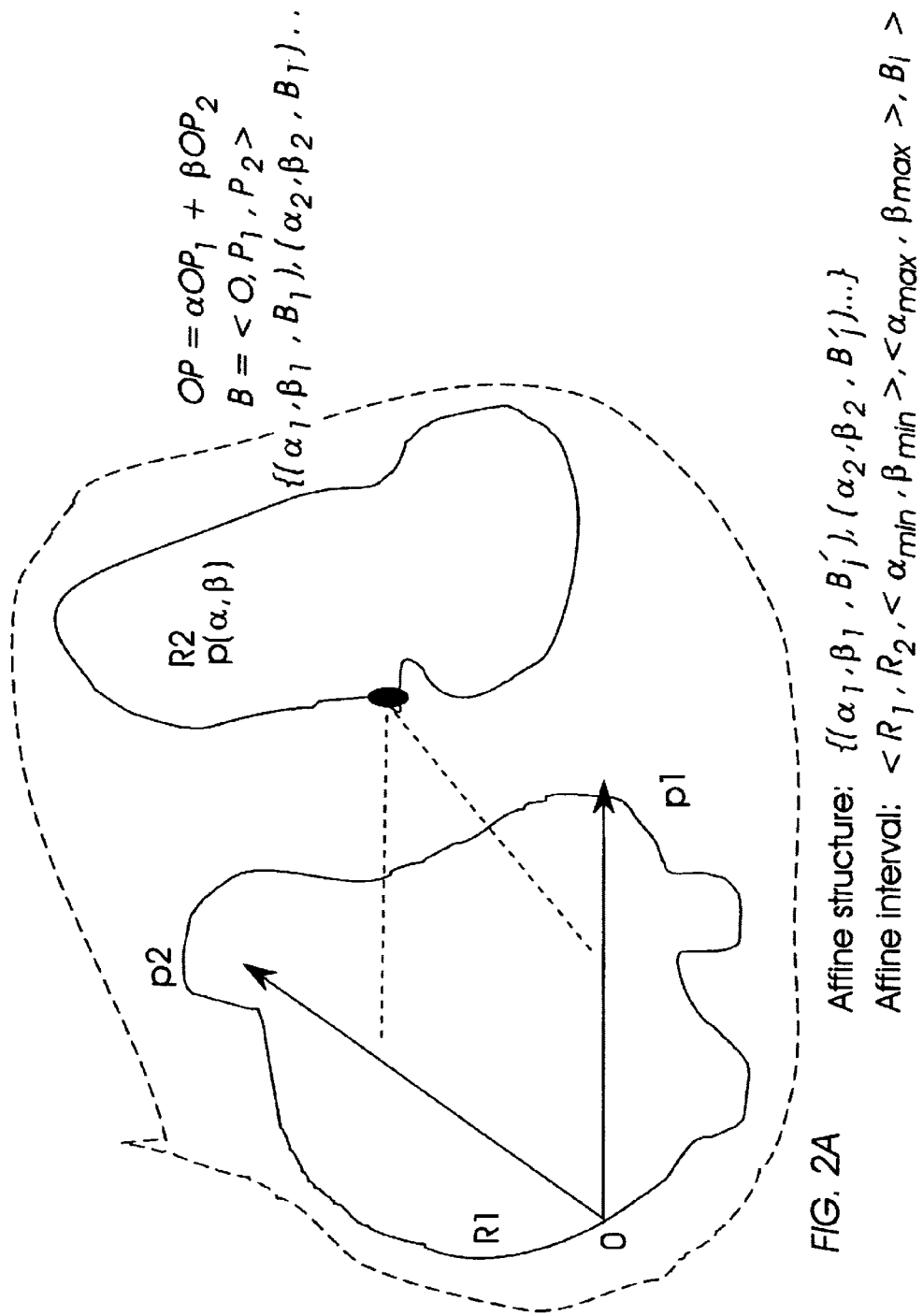
FIGS. 2A–2B respectively illustrate representing objects (modeling spatial layout) and region layout in the method of FIGS. 1A–1B.
Figure 2B:
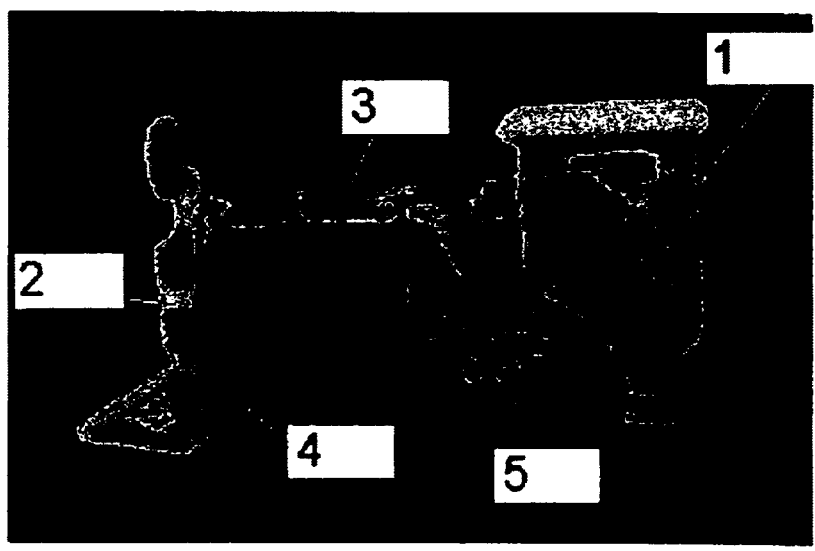
Figure 2C:
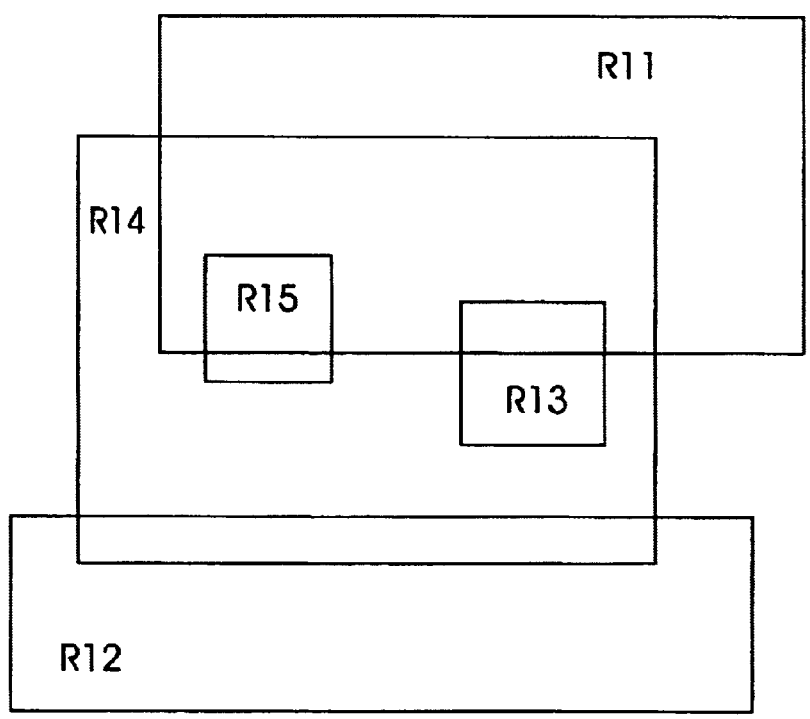
FIG. 2C illustrates the spatial layout of all regions with respect to region 1 using affine intervals.
Figure 3B:
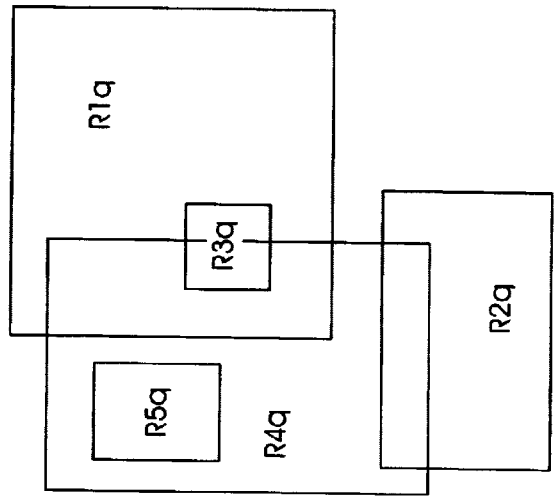
Figure 3B:
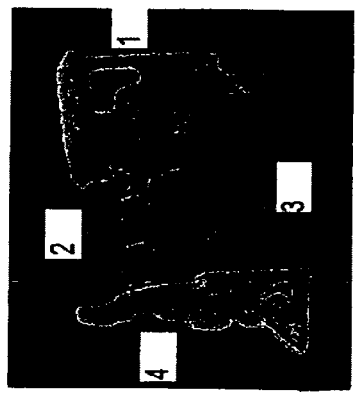
Figure 3A:
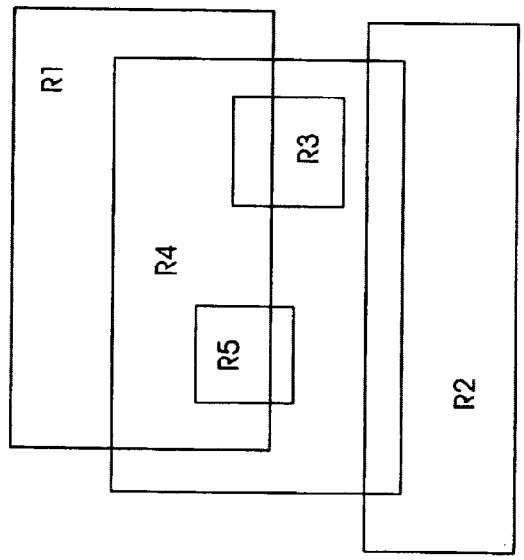
Figure 3A:
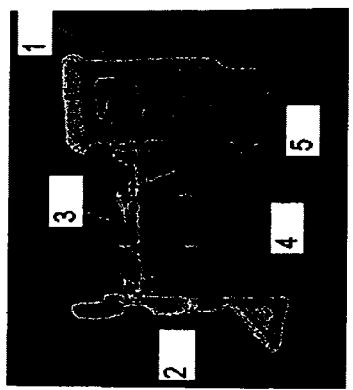
Figure 3C:
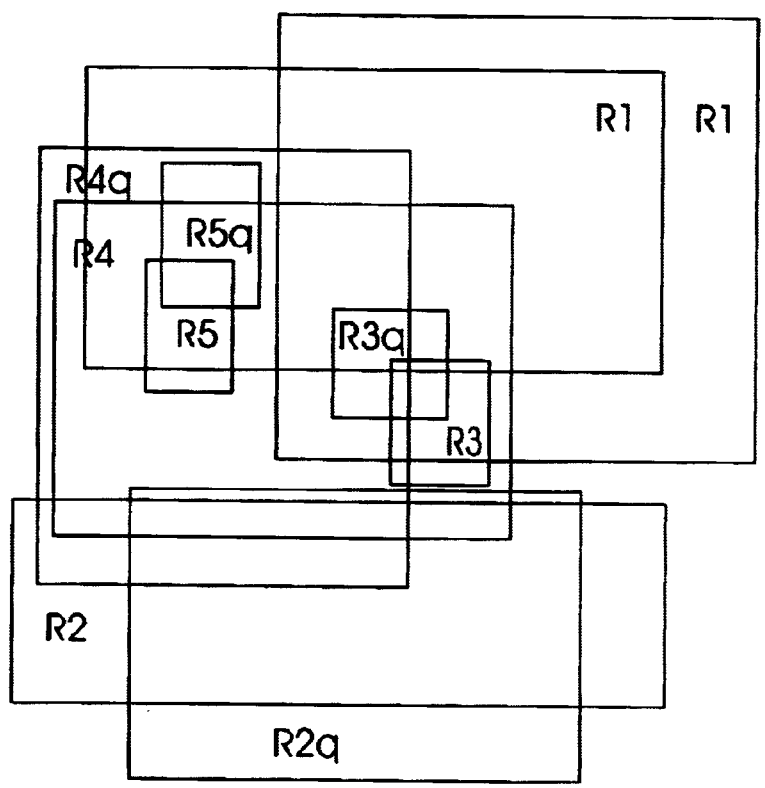

Further, it is advantageous to make such a judgment in a pose-invariant fashion and to allow the presence of distracting regions. The present invention has advantageously modeled the spatial layout of regions in the light of these requirements, as shown in FIGS. 2A–2C.

In modeling spatial layout of color regions, it is well-known that the shape of a 2D object can be described in a pose-invariant fashion by recording the affine coordinates of features within the object computed with respect to a triple of basis features chosen as an object-based reference frame (e.g., see Y. Lamdan et al., "Geometric hashing: A general and efficient mode-based recognition scheme", In *Proceedings of the International Conference on Computer Vision*, pp. 218–249, 1988.

Using this, the relative location of a pair of object regions can be specified precisely and in a pose-invariant fashion by listing the affine coordinates of features of one region computed with respect to triplets of features from the other region serving as a "basis frame".

A simpler yet effective way of describing their relative location is by recording the interval in which affine coordinate values lie. Since such intervals bound the affine coordinates, they are also affine-invariant for 2D objects.

That is, the pair of image regions that actually match a pair of 2D object regions will have identical affine-coordinate intervals (e.g., called "affine intervals"). Doing this pairwise alone, however, can give a number of spurious matches for those regions whose specific affine coordinates vary but fall in the same interval. Such spurious matches can be minimized if evidence from multiple object region pairs can be accumulated, and their region identity can be exploited.

Thus, the representation of spatial layout used by the present invention is:

$$\text{Object layout} = \{(R_i, C(R_i))(R_j, C(R_j)), \text{Int}_{ij})| 1 \leq i, j, \leq M\} \quad (7)$$

where M is the number of object regions, $C(R_i)$ is the label of the region $R_i$ (example, color-label), and $\text{Int}_{ij}$ is a rectangular region in affine coordinate plane given by the extrema $<(\alpha_{min}\beta_{min}), (\alpha_{max}, \beta_{max})>$.

It is noted that, in the presence of occlusions, a single object color region can appear as one or more image regions of the same color. Since occlusions remove the contribution to the affine interval from the lost features, but leave the contribution from the features that are visible unaffected, the overall effect is to shrink the image affine intervals to become a subset of the corresponding object affine intervals.

Affine intervals can also be used to describe the layout of color surface regions for a limited class of 3D objects in constrained poses. In particular, when the depth of the 3D object is small compared to the viewing distance, different views of the 3D object do not cause a drastic change in the range of affine intervals, as portions of the object move in and out of view. This is particularly true for pairs of surfaces that remain visible to the same extent in the different views.

Thus, pose changes of 3D objects cause the affine intervals of corresponding pairs of regions to overlap, with the intervals becoming disjoint or to have minimum overlap as changes in pose become extreme or when regions grow disproportionately large or small as they move in and out of view. In practice, to contain the number of false positives, while still reducing the false negatives, a lower bound on the amount of overlap should be maintained. For the data sets exemplarily tested by the present inventor, a 60% overlap of affine intervals was required.

FIG. 2B illustrates representing region layout including regions of the image, whereas FIG. 2C illustrates the spatial layout of all regions with respect to the region 1 in FIG. 2B using affine intervals. Affine intervals are affine-invariant. Under occlusions and noise, affine-intervals overlap as shown in FIG. 2C.

The concept of shape layout description using affine intervals can be applied uniformly to both an object and an image depicting multiple objects. Specifically, it is used in the offline processing of the images of the database to extract shape information in the images using the following operations.

102.1 Convert the color images of the database to gray images by retaining the intensity component. If the images of the database are grey, no conversion is necessary.

102.2 Perform edge detection using a conventional edge detector such as a canny edge detector to get all edges in the image.

102.3 Extract curves by concatenating edges, and record geometric features such as corners, on curves.

102.4 If a high-level region extraction such as color region extraction has been done as described in step 101, then associate each curve and corners on curves with the label of the enclosing region (e.g., color label of the region) to form groups of curves. Thus each curve group is the set of curves that belong to a semantic region on the object such as a color region.

Retain curves on the contours of the regions for purposes of efficiency.

103 Form basis triples from adjacent features along the curve (using both forward and reverse curve ordering) for each region.

103.1 For each pair of regions, compute affine coordinates of features on curves on the boundaries of one region with respect to basis triples on the other region.

103.2 Put a bounding box around the set of affine coordinates to give affine intervals.

103.3 Associate with each affine interval, the identity of the region pair (note the affine intervals are not commutative), and the region labels (e.g. Color labels) of the respective regions, and the identity of the image they come from.

103.4 Repeat steps 103.1–103.3 for several basis triples per region to give robustness to occlusions.

104. In this step, all the affine intervals computed from pairs of regions in all images of the database are consolidated and represented in a suitable index structure for later indexing during the on-line operations. A preferred embodiment of this invention uses the interval hash tree being disclosed in the abovementioned commonly-filed U.S. patent application Ser. No. 09/593,131, incorporated herein by reference, to store the affine intervals, although the method is not limited to the choice of this data structure. Thus, it will work even with other data structures for representing intervals such as R-trees, R*-trees, etc. The performance of the region hashing, however, can be affected by the choice of the data structure. By using the interval hash tree as the index structure has the unique advantage that all database affine intervals that overlap a set of query object intervals can be found simultaneously without redundant search.

Essentially, the interval hash tree stores the affine intervals by organizing them as a two-way interval tree, namely, an interval tree on the alpha-coordinate. Each middle branch of the interval tree on the alpha coordinate is organized as an interval tree on the beta coordinate. Since each of these trees is balanced, this results in efficient search of the tree during the online operations.

Thus the index structure records all region pairs that give rise to identical affine intervals within as well as across images of the database along with their native region (color) information. The leaf node of the data structure stores the set of region pairs and their associated region label (color) and image information as:

$$N_1 = \{(R_i, C(R_i), R_j, C(R_j), Im_k) \ldots \}$$

Where $R_i$, $R_j$ are the regions of the region-pair, and $C(R_i)$, $C(R_j)$ are the colors of the regions, respectively. $Im^k$ is the image from which the region pairs arise. Here I stands for the affine interval.

Thus, the offline processing of the images of the database can be summarized as including of the steps of extraction of regions in images of the database, computation of geometric features within such regions, computing affine intervals from bounds on the affine coordinates of features of an image region with respect to the basis triples of another image regions, and storing the resulting set of affine intervals in a suitable indexing structure such as the interval hash tree.

On-line Operations:

The purpose of the online operations is to enable the indexing or the localization of a given query object in all of the images of the database. The technique for achieving this is termed region hashing. It is desirable to perform such localization regardless of changes in appearance of the object such as changes in pose, occlusions, etc. To enable region hashing, the query object undergoes a set of processing steps identical to that of the images of the database during the offline operation as described below:

Step 105: This step analyzes the region (color) and shape information in the query pattern (e.g., query object).

105.1 Given a query image depicting a pattern, the regions of the pattern are extracted as in Step 101.

105.2 The features from the resulting regions of the query pattern are extracted as described in step 102 above.

Step 106 Basis triples are formed from adjacent features along the curves for each query region and affine intervals are derived as in step 103.

Step 107 Associate region identity of respective regions with each affine interval.

The difference between these operations and that performed on the database of images is that affine intervals per region pair needs to be done using, at most, one basis triple per region pair during the processing of the query.

REGION HASHING

The next step in online operations is the performance of region hashing. Region hashing involves indexing the database of affine-intervals using intervals derived from the query. Since the affine-intervals are affine-invariant, a query object if present in an image of the database can be seen by the presence of affine intervals of the database overlapping with the query affine intervals. Region hashing is the process of efficiently determining this overlap. It finds evidence for commonality of affine intervals with those computed from region pairs in query by accumulating the hits for region pairs by indexing the database affine intervals using query intervals, to give a strong indication for the location of the query in the image.

That is, for each occurrence of the object in the images of the database, the goal is to find a "basis" object region as the one that corresponds to an image region that is voted by most other image regions as being in similar spatial layout with the corresponding object region.

In this sense, region hashing is similar in spirit to geometric hashing[Lamdan and Wolfson, Proc. ICCV 90], and location hashing [Syeda-Mahmood, Proc. CVPR 99], in that it also trades off computing time spent in searching for matches by space in pre-computing and recording information necessary for localization In particular, it records the region pairs that give rise to identical affine intervals within and across images of a database in the interval hash tree. The region information (e.g., color) of the associated regions is also recorded. The steps involved in region hashing are as follows:

Step 108 Use the color and shape information of the query pattern to index the interval hash tree of the image database. This step is termed color region hashing (also see FIG. 1C) and involves finding a "basis" image region that is voted most by other image regions as being in similar spatial layout with the corresponding query region. Since the affine intervals are affine-invariant, and since they continue to overlap under occlusions, indexing the data structure for database intervals that overlap with query intervals leads to identification of the area of the image containing the object.

108.1 For all query region pairs $$F_q = (R_{qi}, C(R_{qi}), R_{qj}, C(R_{qj}), I_q)$$

index the interval hash tree to retrieve a set of matching image region pairs. That is, the indexing step searches the interval hash tree for all affine intervals that overlap the query affine interval. Of these, those intervals in which the corresponding region pairs that match in region identity query region pairs are retained.

In the case of color regions, only those database region pairs that have the same color label as the corresponding query pairs will be retained. The method of determining all database intervals that overlap a set of query intervals is an important search operation in interval hash trees and has been completely disclosed in the above-mentioned related U.S. patent application Ser. No. 09/593,131, incorporated herein by reference.

Step 109: For each matching image region pair $(R_1, C(R_1), R_m, C$ (R and its associated affine interval I, update the histogram of hit $^h(R_1, R_{qi})$ of the region that originated the affine interval, by the fraction of overlap. The score of the matching image (from which the indexed region pairs arose) is similarly updated.

109.1 Rank all non-zero score image-query region pairs obtained above and select the few best matching image-query region pairs.

Step 110 The corresponding images are declared as containing the query object. The matching regions are used to localize the query object in the matching images.

Step 111. The final step verifies the presence of the object at the indicated location using the corresponding set of basis triples for the region pairs hashed, using the well-known observation that a triplet of corresponding basis triple is sufficient to solve for the pose of the 2d object at the indicated location. It is noted that the object layout can be performed very quickly with the invention.

That is, since the affine intervals of all region pairs per image are present in the interval hash tree, its size is $O(\hat{A}_{i=1}^P N_i^2)$ for P images, and $N_i$ regions per image. The construction of the interval hash tree takes $$O\left(\sum_{i=1}^{P} N_i^2 \log N_i\right)$$

time following the construction time for red-black trees (e.g., see T. Cormen et al.). Since all regions pairs on the object are used to index the interval hash tree, region hashing takes $$O\left(R_0^2 \log\left(\sum_{i=1}^{P} N_i^2\right)\right) = O(R_0^2(\log P + \log N))$$

(here $R_O$ are the regions on the object).

Hence, for typical number of regions on the object (8 to 10) and images (between 30 to 50), and the reduced set of regions that match in color (around 10), the search for object layout can be done very quickly.

FIGS. 1A–1B illustrate the method 100 of locating multi-featured (e.g., color) objects in an image or a video database according to the present invention, with FIG. 1B illustrating an "off-line" portion of the method and FIG. 1B illustrating an "on-line" ("live" portion of the inventive method).

FIGS. 2A–2B respectively illustrate representing objects (modeling spatial layout) and region layout in the method of FIGS. 1A–1B.

Figure 4B:
FIGS. 4A–4C are a dataset (images) illustrating object indexing using region hashing.
Figure 4A:
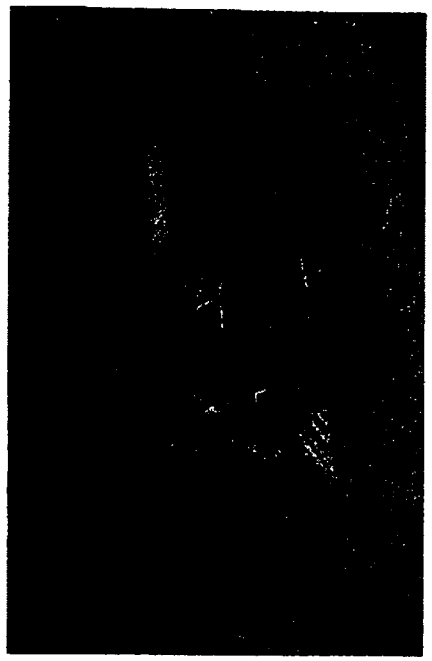
Figure 4C:
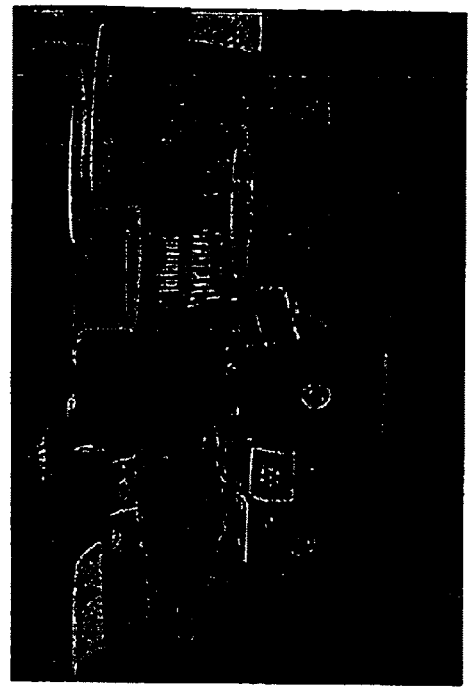

FIG. 2C illustrates the spatial layout of a set of regions of the object of FIG. 2A (possessing color yellow and red) with respect to a region 1 FIGS. 4A–4C are a dataset (images) illustrating object indexing using region hashing. FIGS. 4D–4F, corresponding to images 4A–4C, illustrate the use of region identity alone for finding queries in images.

More specifically, FIGS. 4D–4F illustrate the result of detecting regions in the respective images of FIG. 4A–4C based on region identity alone, i.e., based on a color match of the regions. The result of region hashing is also indicated in this figure.

For example, the result of (4,2,1.82)(2,4,0.72) (2,3,0.58) shown in FIG. 4E indicates that region hashing gives the best match for region 2 in the query object of FIG. 4D to be region 4 of the image of FIG. 4E, and that the best match for region 4 of the query object of FIG. 4D is the region 2 of the image of FIG. 4E. Similarly, the match (4,3,1.34)(4,4,1.3) (3,1,0.69) for the image of FIG. 4F indicates that region hashing correctly identifies the matching region to query region 1 as the image region 3 even if the object appears in a different pose (is rotated and reflected) by correctly interpreting the collection of image region as having a similar spatial layout to the query regions.

In the image of FIG. 4E, it is seen that region 2 of the image matches to both region 3 and 4 which is correct, and is therefore able to account for color region detection errors that split a single color region into two in two different appearances of the object.

Finally, in the image of FIG. 4F, it can be concluded that the best evidence was for regions 3,4 and 1 on the object, correctly accounting for the unoccluded portion of the object seen in the image Hence, the inventive method localizes objects in images using a technique called region hashing, which is a two-step process of recording the region layout in an index structure during database creation, and indexing the data structure using region information of the query, and accumulating evidence for a region "hit". The result is a set of regions in images that are most likely to come from a query, thus localizing the query without performing a detailed search of either the database or regions within images.

Image Indexing Performance

Since the size of the interval hash tree grows quadratically with the number of regions in images, and the regions in images are much fewer than features, the size of the interval hash tree for even the large collection of images tested in the exemplary implementation was less than a megabyte, making it possible to index images without any paging-related I/O problems. The indexing time using a C/C++ implementation on a Windows NT® platform (200 Mhz CPU and 250 Mbytes paging size) was mainly in the processing of the query features which was about 1 second, followed by the retrieval which was about 0.5 seconds.

The false negatives observed were mostly for 3D objects showing a great change in pose that fell beyond the bounds of acceptable overlap of affine intervals, and in which not a single region with stable views was found, Some of the false negatives could also be assigned to errors in color region detection. However even in this case, the localization technique was effective if at least a pair of object regions could be detected.

False positives occurred when the regions in images were of similar color and spatial layout, as was expected.

It is noted that a special feature of the region localization technique is its ability to reduce the features needed for recognition of objects within images.

The method and apparatus of the present invention, as is now evident, have many novel aspects including retrieving images and regions within images containing a multi-region query object, such that the combined use of region identity (color)and geometric layout that localizes object in an illumination invariant and affine-invariant manner.

Further, the method applies uniformly to locate 2D as well as 3D objects in 2D data, and the representation of shape in terms of affine intervals is novel. It is noted that the interval hash tree itself is a novel data structure that has a variety of applications in computational geometry and is being claimed in the above-mentioned co-pending U.S. patent application Ser. No. 09/593,131.

Thus, the invention provides a feature (e.g., color, text, slides, groups, etc.) region hashing technique of indexing the interval hash tree and recording the histogram of region hits.

Further, it is noted that the invention provides unique advantages over conventional geometric hashing techniques. Such techniques have been extensively analyzed by various researchers. The problems identified have been the issues of (a) hash table quantization causing false negatives (b) the fullness of the hash table causing false positives and (c) an enormous rise in complexity in space and time when extended to image databases. The quantization issue is avoided in region hashing because of the continuous representation of affine intervals. Also, since the IHT guarantees that all overlapping intervals are discovered, false negatives are reduced.

Excessive false positives are also avoided by selective generation of affine intervals using consecutive basis triples on curves from pre-grouped region pairs, thus reducing the chance of random matches, as confirmed through experimental data. Finally, by using affine intervals instead of affine coordinates, the number of data points represented is reduced without affecting the recognition/localization accuracy.

In comparing region hashing with other spatial region adjacency graph based matching methods, the hashing for best matching region pairs can be interpreted as a way of directing the search during subgraph matching using the overlap of intervals as a criterion.

Finally, region hashing differs from other techniques that attempt recognition by regions by explicitly building a model of region layout, and also addressing the problem of search for matching region layout. Further, the invention is robust in the presence of occlusions and noise in feature extraction due to the built-in redundancy.

Figure 5:
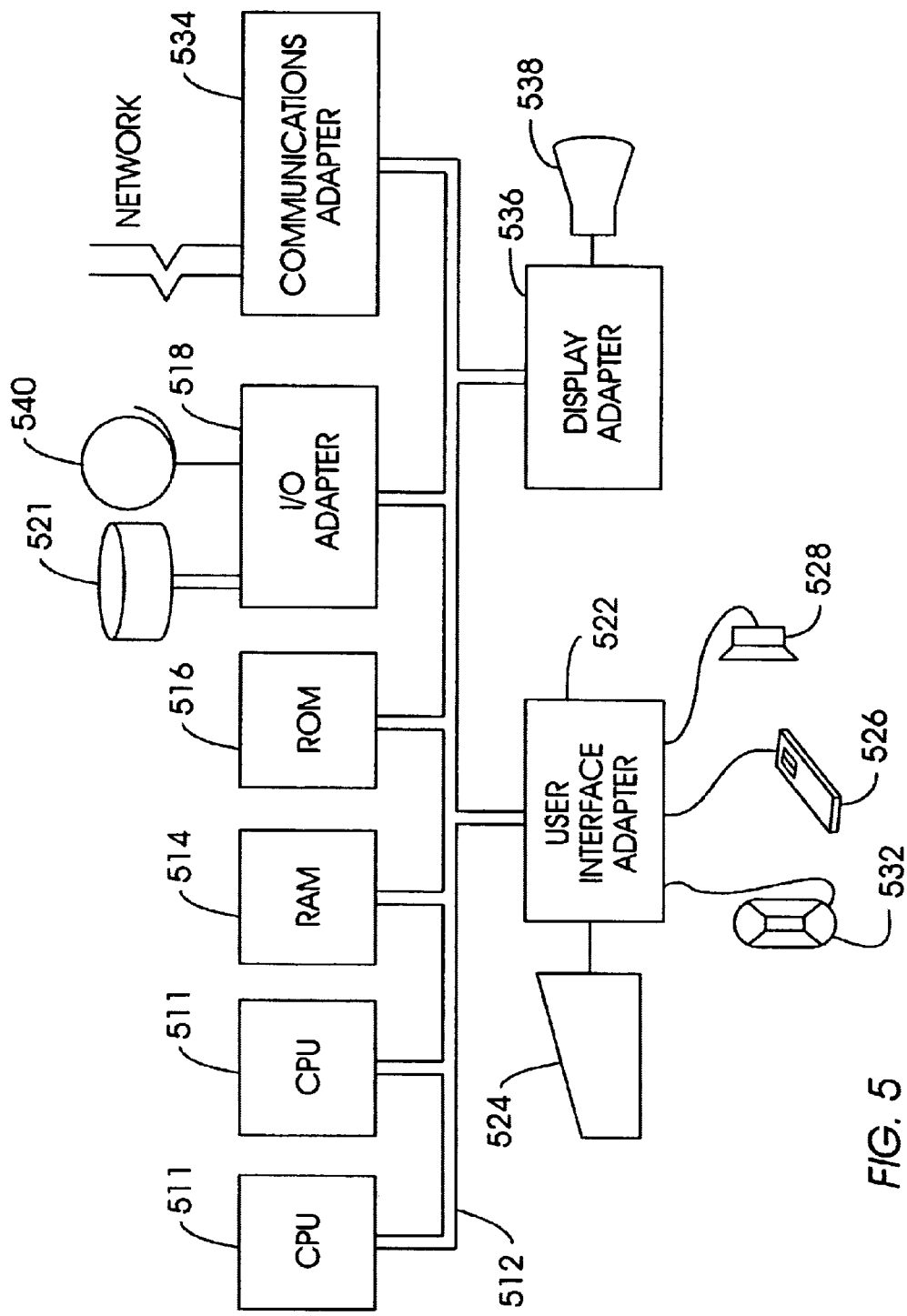
FIG. 5 illustrates an exemplary hardware/information handling system 500 for incorporating the present invention therein.
Figure 6:
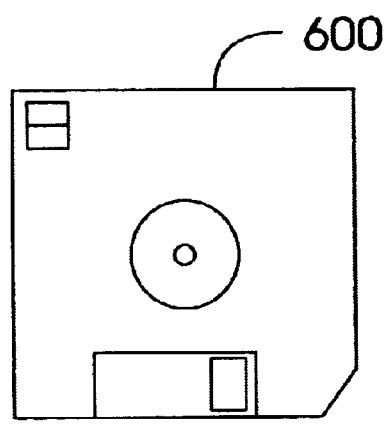
FIG. 6 illustrates a signal bearing medium 600 (e.g., storage medium) for storing steps of a program of a method according to the present invention.

FIG. 5 illustrates a typical hardware configuration of an information handling/computer system for use with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious features of the present invention, a novel method is provided for region hashing including detection of color regions using an illumination and pose-invariant color descriptor, providing a pose-invariant (for 2-dimensional patterns) way of capturing spatial layout through affine coordinate intervals, and r region hashing that involves combined representation of region identity (color)and shape in the interval hash tree, and its use for localizing a query within images of the database.

While the invention has been described in terms of several preferred embodiments, those skilled in the art will recognize that the invention can be practiced with modification within the spirit and scope of the appended claims.

For example, other features other than color may be extracted and employed. Thus the same essential technique can be used to localize texture patterns in video.

Further, for purposes of completion and the reader's clarity, the interval hash tree creation and search operations are briefly discussed below.

INTERVAL HASH TREE CONSTRUCTION

Figure 7A:
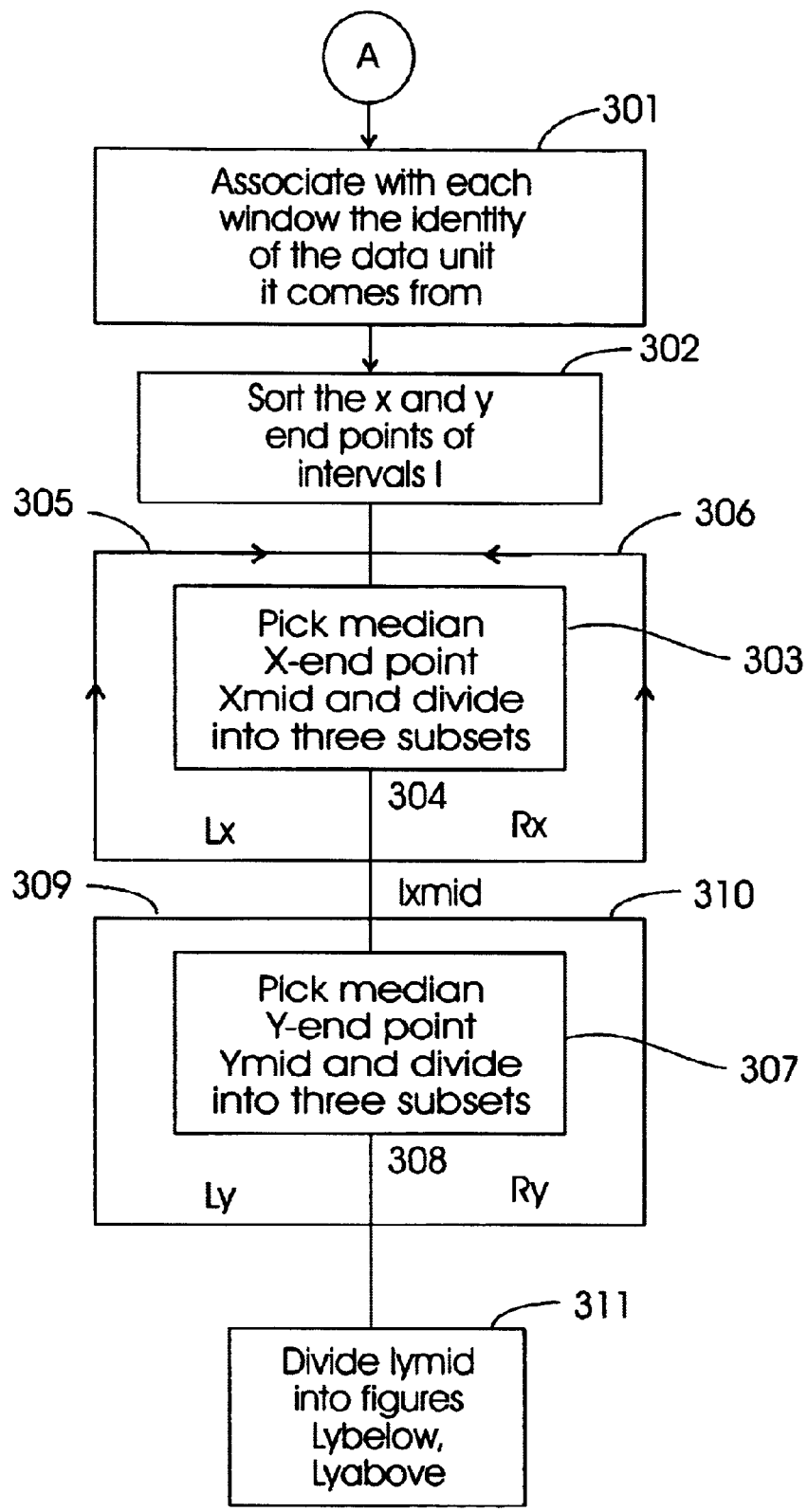
FIG. 7A illustrates a method of constructing an interval hash tree (IHT) according to the invention.

FIG. 7A illustrates a brief flowchart of the method of constructing the interval hash tree, and its steps are described below.

Briefly, to construct the interval hash tree, first in step 301 associate with each rectangle, the identity of the data units it comes from. In the case of region hashing, this involves associating with each rectangle (affine interval) its image index, its region pair index, and the basis triple index. That is, with each affine interval $\{(\alpha_{min}, \beta_{min}), (\alpha_{max}, \beta_{max})\}$ is associated with the set $\{R_i, R_j, I_p, B_{ik}\}$ where $I_p$ is the image within which region pairs $(R_i, R_j)$ are present, and where the affine coordinates of features of region $R_j$ computed with respect to a basis triple $B_{ik}$ in region $R_i$ lie in the stated affine interval.

This allows the consolidation and hence direct indexing of all images in the database and the locations within images (as indicated by the regions ($R_i$, $R_j$) and the basis features $B_{ik}$ which contain potential matches to a query affine interval and hence its associated query region pairs.

The resulting set of rectangles are sorted based on the first coordinate (i.e. the a coordinate) (step 302). Let the sorted set of intervals be denoted by I. Let Xmid be the median end point in set I (step 303). The interval I is split into three subsets, namely, $I_{xleft}$, $I_{xright}$, and $I_{xmid}$, to correspond to the set of intervals whose left and right x-end points are to left of Xmid, to the right of Xmid, and whose left x-end point is to the left and right x-end points are to the right of Xmid respectively (step 304). A bounding rectangle for the rectangles spanned by the set I can additionally be included for ease of searching at the node.

The interval $I_{xmid}$ then forms the central branch of a node of the x-interval tree and the $I_{xleft}$, and $I_{xright}$, form left and right subareas (denoted by Lcx(Vx) and Rcx(Vx)) of the node Vx of the x-interval tree as indicated below:

$$V_{xI} = \{(X\text{mid}, V_{ylxmid}), Lcx(V_x) = V_{xlxleft}$$

$$Rcx(Vx) = V_{xlxright}\} \quad (1)$$

Each of the left and right subareas are recursively constructed in a similar manner (steps 305 and 306) by repeatedly picking their median x-end point and splitting into the three subsets explained above. The algorithm for the x-interval tree construction directly follows from the description of the node above.

The central branch of each node of the x-interval tree Ixmid is organized as a y-interval tree as follows. The set $I_{xmid}$ of affine intervals is now sorted based on the second coordinate, and the median y-end point Ymid is picked (step 307). The set $I_{xmid}$ is then divided into three subsets, $I_{ybelow}$, $I_{yabove}$ and $I_{ymid}$ (step 308) that contain affine intervals whose above and below y-end points are below Ymid, above Ymid, and whose above and below y-end point are on either side of Ymid respectively. A bounding rectangle of the set $I_{xmid}$ can additionally be stored at this node for ease of interval search. The interval $I_{ymid}$ then forms the central branch of a node of the y-interval tree and the $I_{ybelow}$ and $I_{yabove}$ form left and right subareas (denoted by Lcy(Vy) and Rcy(Vy)) of the y-interval tree node $V_y$ as indicated below.

$$V_{ylxmid} = <(I_{ymid} = \{L_{Yabove}, L_{Ybelow}\}, Y\text{mid},$$

$$\text{Data}(V_{ylxmid})), Lcy(V_Y) = V_{ylybelow} \quad (2)$$

$$Rcy(V_Y) = V_{Ylyabove}> \quad (3)$$

The set $I_{ymid}$ is actually represented as two lists $L_{Ybelow}$ and $L_{Yabove}$ that capture the below and above end-points respectively, of the intervals in $I_{xmid}$ which straddle Ymid (step 311). $L_{Ybelow}$ sorted in increasing order while $L_{Yabove}$ is sorted in decreasing order to enable range searching as we will show later. Finally, the above and below branches of the y-interval tree are recursively generated by going back to step 307 (as indicated by steps 309, 310). It is noted that unlike in the case of non-leaf nodes of the x-interval tree, the data associated with rectangles is listed under the central branch of a node in the y-interval tree. In the case of region hashing, this data constitutes the image index, the region index, and the basis triple index, necessary for query localization.

Figure 8A:
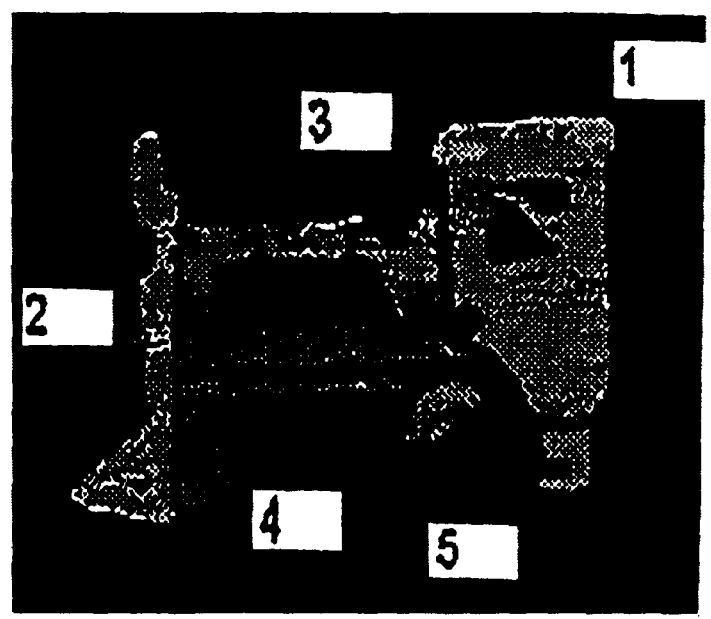
FIGS. 8A–8C illustrate affine intervals and their corresponding interval hash tree (IHT), and more specifically.
Figure 8B:
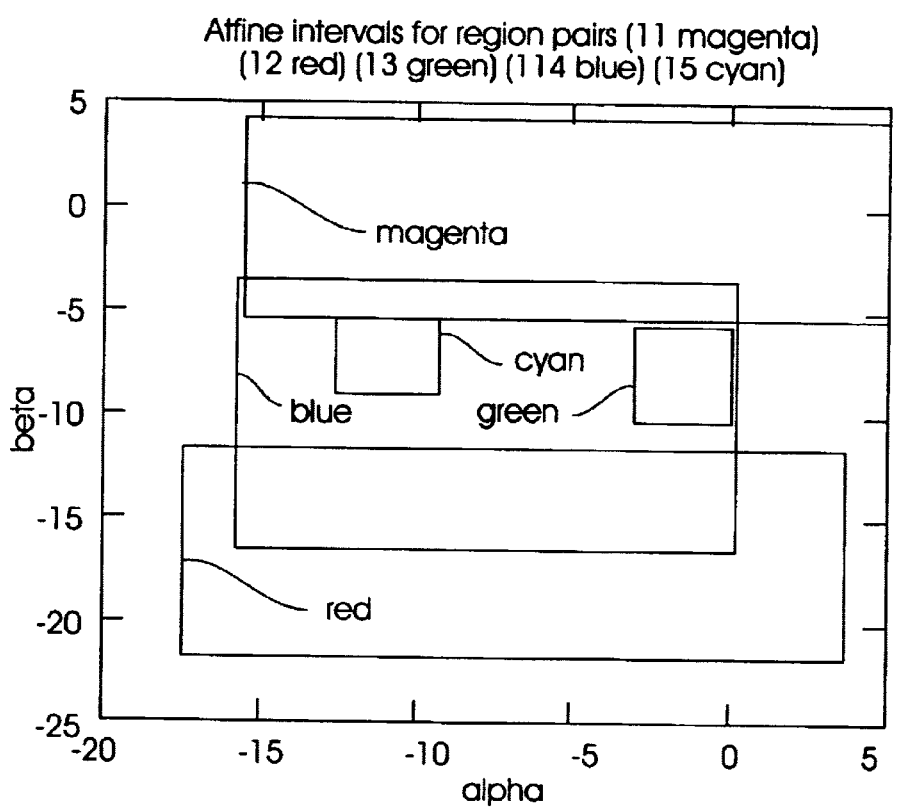
Figure 8C:
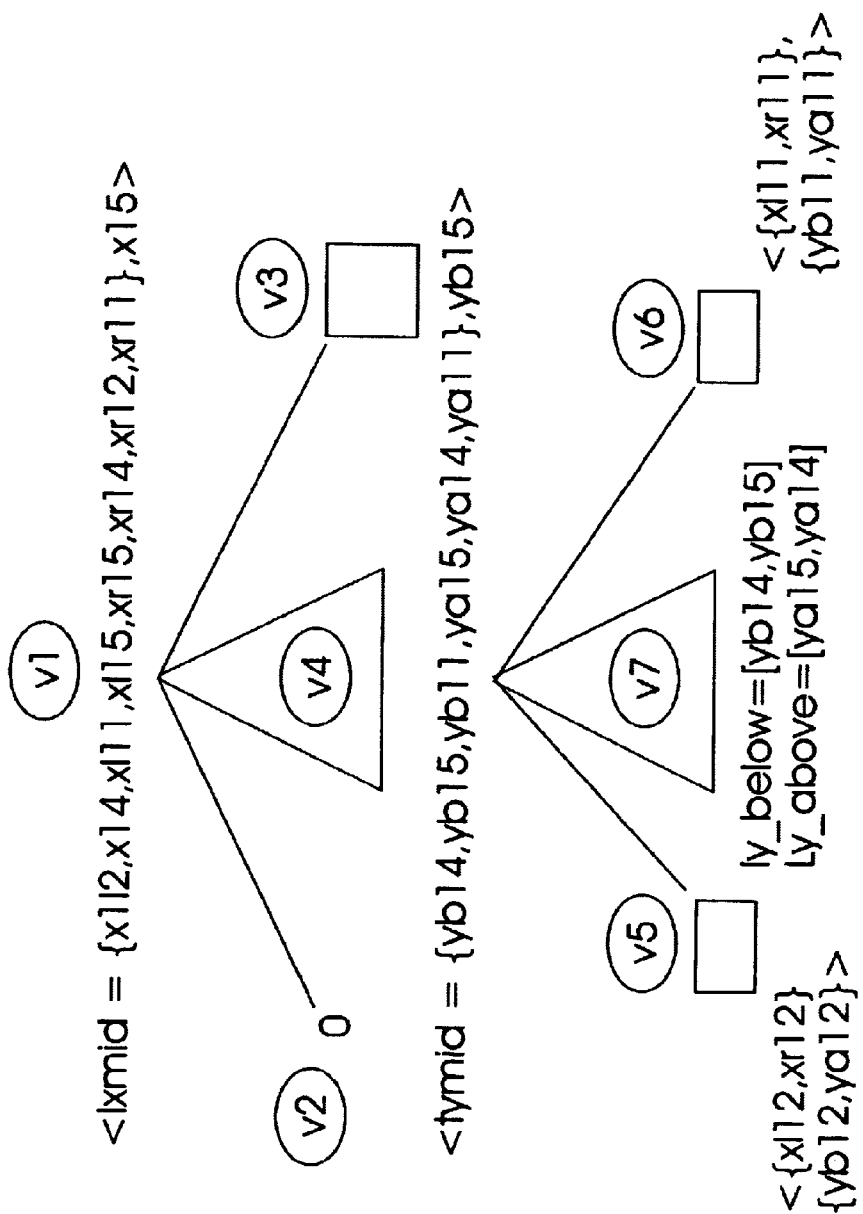

FIG. 8(c) depicts an interval hash tree for a set of rectangles (affine intervals). These intervals are obtained by pairing region marked 1 on the object depicted in FIG. 8(a) with respect to all other marked regions on the object. The affine intervals themselves are indicated in FIG. 8(b). Here Xlij, Xrij stand for the left and right end points of the affine interval of region j computed with respect to a basis triple in region i (in this case, the middle basis triple on region 1's contour). The empty branches of the tree are denoted by circles and single interval branches by the interval itself. Although the lists Ixmid and Iymid are indicated at the nodes for purpose of illustration, only the median point Xmid (Ymid) and the bounding rectangle of the intervals under a tree node are stored at each node. For a leaf node, this reduces to the affine interval itself.

Thus, to construct an interval hash tree from a database of windows preferably includes the following steps (or equivalents thereof), as shown in FIG. 7A. That is, the interval hash tree construction includes first associating with each window, the identity of the data unit it comes from. Thus, if the data unit in the database is an image, then associate with the window, the number of the image that contains it.

Then, sort the windows using one of the coordinates, called, the x-coordinate. Let the sorted windows be denoted by the set I.

Thereafter the X-interval hash tree is constructed by running CONSTRUCT_X_INTERVAL_HASH_TREE (I) algorithm.

The x-interval hash tree in turn is constructed using the y-interval hash tree by running CONSTUCT_X_INTERVAL_HASH_TREE(I) as follows.

First, if the set I is an empty set, then an empty leaf is returned. Otherwise (e.g., set I is not an empty set), then a node $V_x$ is created by picking a median coordinate Xmid of the set I and storing Xmid with V.

Then, three intervals, called $I_{xleft}$, $I_{yright}$, and $I_{xmid}$, are computed. $I_{xleft}$ is the set of windows whose left and right x-end points are to the left of Xmid. Ixright is the set of windows whose left and right x-end points are to the right of Xmid. Finally, $I_{xmid}$ is the set of windows whose left-x-end point is to the left of Xmid, and whose right x-end-point is to the right of the Xmid.

Thereafter, the windows left in $I_{xmid}$ are sorted based on their second coordinate (again, this example assumes a two-dimensional case), called the y-coordinate (In the case of affine coordinates, the y-coordinate is the beta-coordinate).

Then, for Vy=CONSTRUCT_Y_INTERVAL_HASH_TREE($I_{xmid}$), store a pointer to Vy at node $V_x$ and repeat the above steps on the $I_{xleft}$ and let Lcx($V_x$).

To construct the interval hash tree for $I_{xleft}$, run CONSTRUCT_X_INTERVAL_HASH_TREE($I_{xleft}$), in which the above steps are repeated for the $I_{xright}$, and let Rcx($V_x$).

To construct the interval hash tree for Iright, run CONSTRUCT_X_INTERVAL_HASH_TREE(Ixright), in which Lcx is made the left child of $V_x$ and Rcx is made the right child of $V_x$. Then, $V_x$ is returned.

The y-interval hash tree in turn is constructed using the following steps.

CONSTRUCT_Y_INTERVAL_HASH_TREE ($I_{xmid}$)

First, if $I_{xmid}$=empty set, then an empty leaf is returned. Otherwise, a node Vy is created and Ymid, the median point in the sorted list Imid, is computed and Ymid is stored with Vy.

Then, three intervals called $I_{yabove}$, $I_{ybelow}$, $I_{ymid}$, are computed. $I_{yabove}$ is the set of windows whose above and below y-end points are above Ymid. $I_{ybelow}$ is the set of windows whose above and below y-end points are below Ymid. $I_{ymid}$ is the set of windows whose above y-end points are above Ymid, and whose below y-end points are below Ymid.

Thereafter, the lymid list is divided into two sublists called $L_{yabove}(VY)$ sorted on the above y-end point, and $L_{ybelow}(Vy)$ sorted on the below y-end point. Then, these two lists are stored at Vy.

Then, the above is repeated for the $I_{yabove}$ list, and let Lcy(Vy) Then, CONSTRUCT_Y_INTERVAL_HASH_TREE($I_{yabove}$) is run which includes repeating the above steps on the $I_{ybelow}$ list for Rcy(Vy).

Then, CONSTRUCT_Y_INTERVAL_HASH_TREE ($I_{ybelow}$) is run in which Lcy(Vy) is made the left child of Vy and Rcv(Vy) is made the right child of Vy, and (Vy) is returned.

Hereinbelow, a method of search for all overlapping database windows with a single query window will be presented. Then, such a method will be generalized to multiple query windows.

SEARCHING FOR OVERLAP FOR A SINGLE QUERY WINDOW

Given an interval hash tree designated by a root (Vx) and a single query window Q=(Qlx, Qrx, Qay, Qby) where Qlx and Qrx are the left and right x-end points of the query window, and Qay, and Qby are the above and below y-end points of the query window, the following operations are used to search for all overlapping database windows. QUERY_X_INTERVAL_HASH_TREE(Vx,Q)

First, it is determined if $V_x$ is not a leaf. If $V_x$ is not a leaf, and if Qix<Xmid($V_x$) and Qrx>Xmid($V_x$), then the $I_{xmid}$ portion of the tree is explored as QUERY_Y_INTERVAL_HASH_TREE(Vy,Q).

In this query, QUERY_X_INTERVAL_HASH_TREE (Lex(Vx),Q) and QUERY_X_INTERVAL_HASH_TREE(Lex($V_x$),Q) are run.

Otherwise, if Qix<Qrx<Xmid($V_x$), then QUERY_Y_INTERVAL_HASH_TREE(Vy,Q) and QUERY_X_INTERVAL_HASH_TREE(Lex($V_x$),Q) are run.

Otherwise, QUERY_Y_INTERVAL_HASH_TREE (Vy,Q) and QUERY_X_INTERVAL_HASH_TREE(Rex ($V_x$),Q) are run.

Where the search within the $I_{xmid}$ portion of the tree is captured by QUERY_Y_INTERVAL_HASH_TREE invoked on the Vy node representing the y-interval tree, the operations for the querying of the y-interval tree are given below.

That is, first QUERY_Y_INTERVAL_HASH_TREE (Vy,Q) is run. That is, if Qay>Ymid(Vy) and Qby<Ymid (Vy), then all windows within the lymid are determined to be overlapping. Then, the process walks along the list $L_{yabove}$ (VY) starting with the top-most endpoint and computes an overlap with all the windows spanned in $L_{yabove}(Vy)$.

Then, QUERY_V_INTERVAL_HASH_TREE(Lcy (Vy),Q) and QUERY_Y_INTERVAL_HASH_TREE (Lcy(Vy),Q) are run.

Otherwise, if Qay>Qby>Ymid(Vy), then the process walks along the $L_{yabove}$(VY) starting at the interval with the top-most endpoint, and all windows that contain Qby are reported. As soon as a window that does not contain Qby is met, then the process stops.

Then, QUERY_Y_INTERVAL_HASH_TREE(Lcy (Vy),Q) is run.

Otherwise, the query window is below Ymid, and the process walks along the $L_{ybelow}(Vy)$ starting at the interval with the bottom-most endpoint, reporting all windows that contain Qay. As soon as a window that does not contain Qay is met, then the process stops and QUERY_Y_INTERVAL_HASH TREE(Rcy(Vy),Q) is run.

Figure 7B:
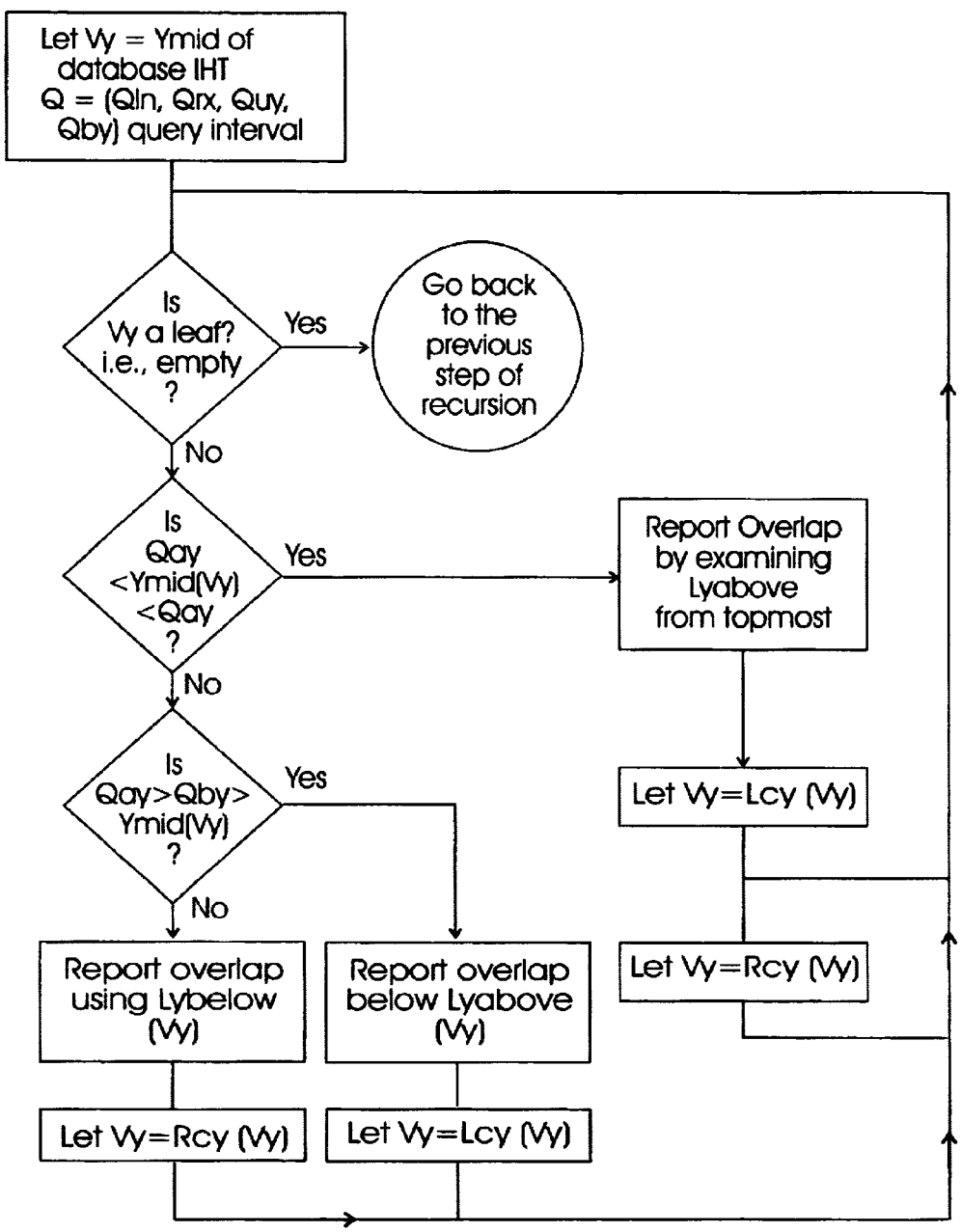
FIG. 7B illustrates a flow chart of a query y-interval hash tree step of searching an IHT using a single query window.
Figure 7C:
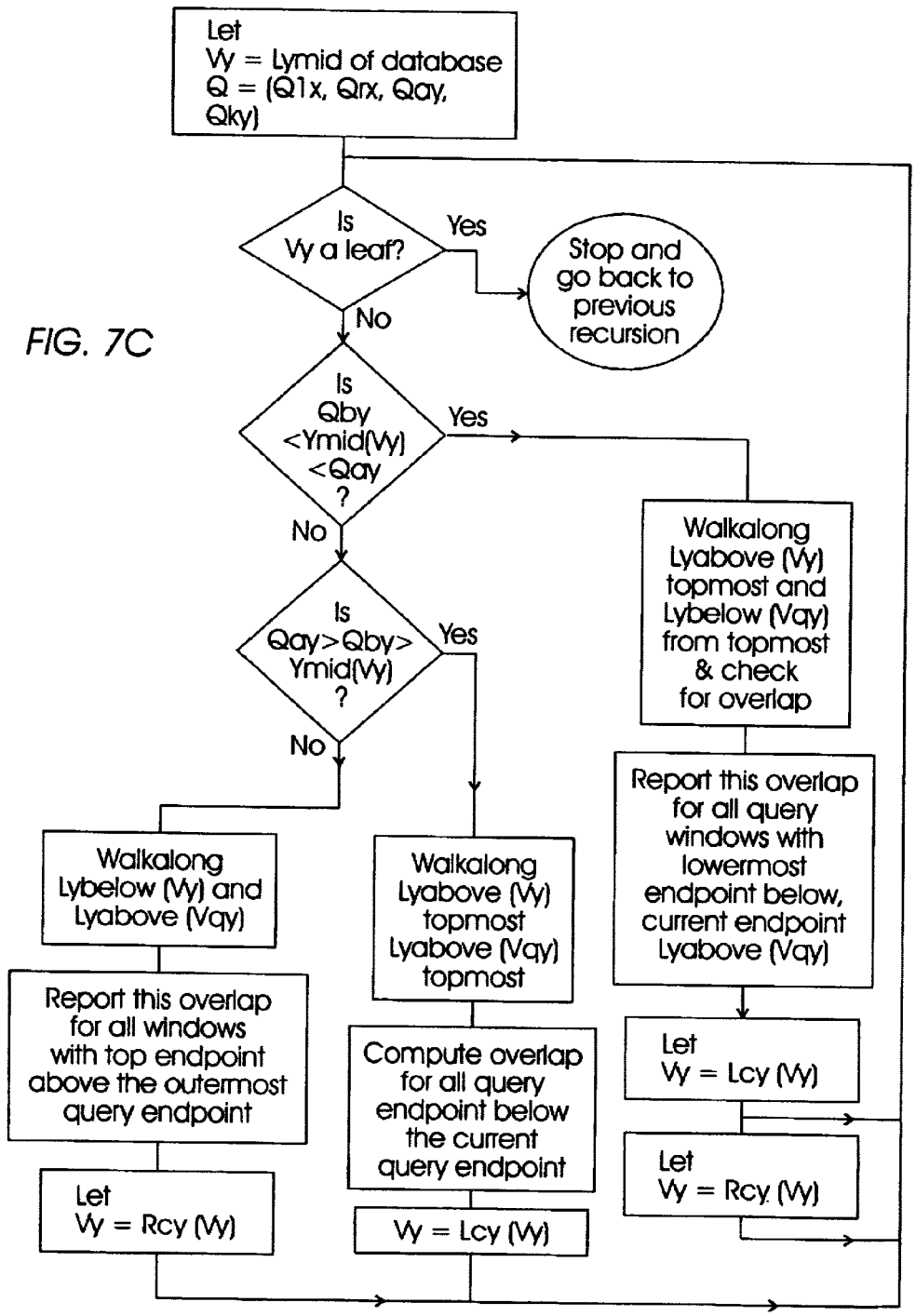
FIG. 7C illustrates a flowchart of a multiple query y-interval hash tree step of searching for multiple query windows.
Figure 7D:
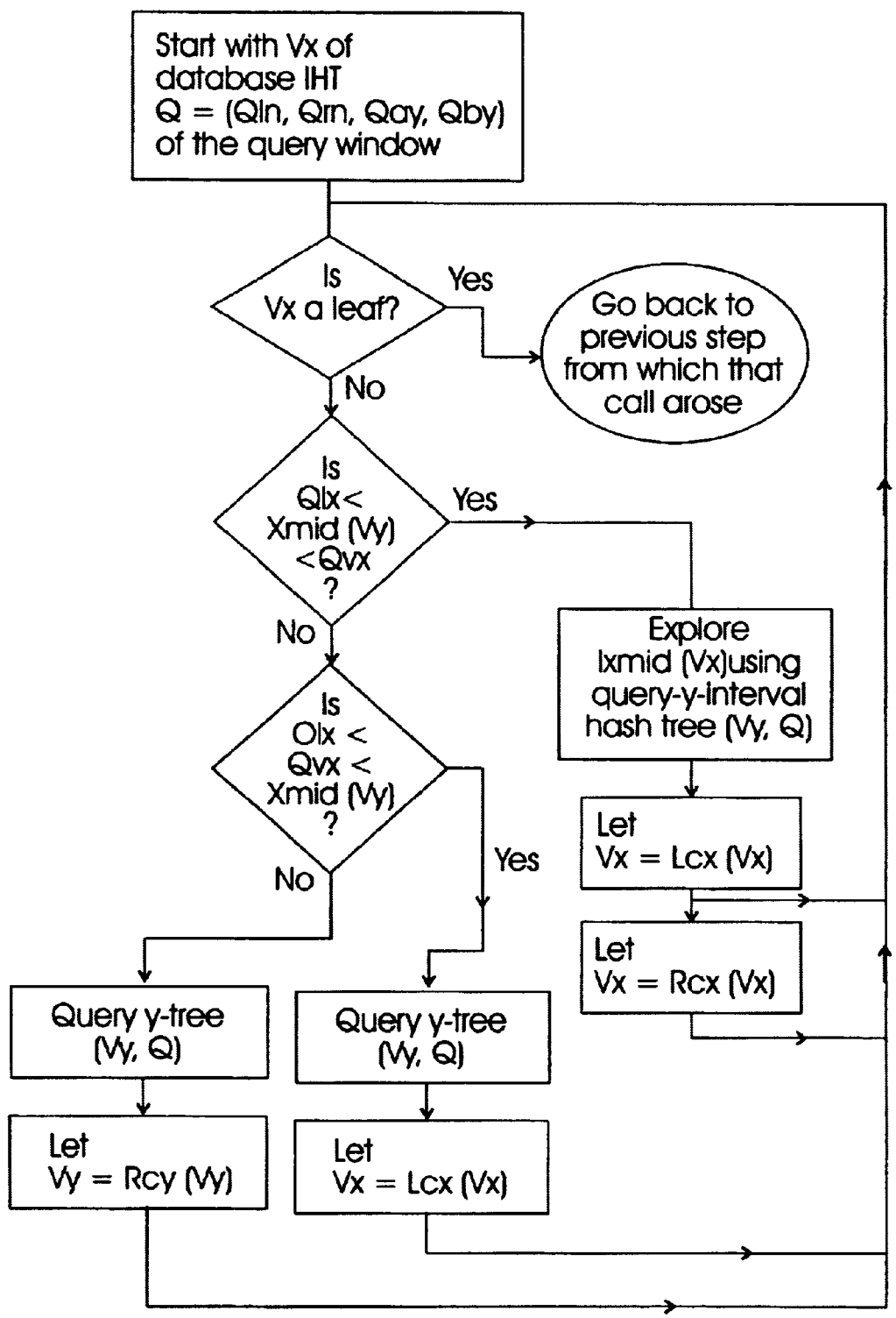
FIG. 7D illustrates a flowchart of a query-x-interval hash tree step of searching the IHT using a single query window.

FIG. 7B shows a flow chart of the query y-interval hash tree step of searching an IHT using a single query window, whereas FIG. 7D shows a flowchart of a query-x-interval hash tree step of searching the IHT using a single query window.

SEARCHING FOR MULTIPLE QUERY WINDOWS

To search for multiple query windows, the above concept is extended by the invention to advantageously address the problem of searching for all database intervals that overlap with a given set of query intervals. The invention organizes the rectangles affine intervals of the query also as an interval hash tree, and performs a careful simultaneous search of database and query IHT in a way that maintains the property that a database interval that overlaps more than one query interval is discovered only once.

To perform this search, a version of the IHT construction is used that retains the bounding box of all affine intervals under a tree node (x or y-tree node) as part of the node information.

Using this additional piece of information and a pre-order traversal at both the x and y query IHT levels, nodes of the query IHT are successively searched against the nodes of the database IHT. Thus, at the x-level node $V_x$, the range (Qlx,Qrx) in which the left and right x-end points of the interval $I_{xmid}$ are noted along with $V_x$. Similarly, at the y-level node Vy, the range in which the top and bottom y-end points of windows (Qay,Qby) in the interval $I_{ymid}$ are stored at Vy.

Then, searching for multiple query windows is done by using the range at each node to identify candidate nodes to search in the database interval hash tree.

The search within the $I_{ymid}$ of a node is done by sequentially scanning bottom endpoints in reverse sorted order, and simultaneously incrementing the overlap count for all overlapping query windows.

The following algorithm does a pre-order traversal of the query interval hash tree, each such traversal results in updating the set of overlapping windows for each query window.

SEARCH_MULTIPLE_QUERY_WINDOWS(Vd, Vq)

That is, if it is determined that Vq is not a leaf and if $I_{xmid}$(Vxq) is non-empty, then let Q=(Qlx,Qrx,Qay,Qby) be the range associated with Vqx and Vqy at this level.

Thereafter run MULTIPLE_X_INTERVAL_HASH_TREE(Vd,Q), SEARCH_MULTIPLE_QUERY_WINDOWS(Vd,Lcy(Vyq)), and SEARCH_MULTIPLE_QUERY_WINDOWS(Vd,Rcy(Vyq)). Also, run SEARCH_MULTIPLE_QUERY_WINDOWS(Vd,Lcx (Vxq)), and SEARCH_MULTIPLE_QUERY_WINDOWS(Vd,Rcx(Vxq)).

In the above, $V_x$ refers to the node of the database interval hash tree. The Q here stands for the query node which includes the windows spanned by the range (Qlx,Qrx,Qay, Qby) in the lymid of the Vq, the current node being explored in SEARCH_MULTIPLE_QUERY_WINDOWS.

Then, an interval hash tree is created for supporting the searching of the multiple query windows in which MULTIPLE_X_INTERVAL_HASH_TREE(Vx,Q) is run.

That is, it is determined whether $V_x$ is a leaf or not. If $V_x$ is not a leaf and if it determined that $Qlx<Xmid(V_x)$ and $Qrx>Xmid(V_x)$, then the $I_{xmid}$ portion of the tree is explored as MULTIPLE_QUERY_Y_INTERVAL_HASH_TREE (Vy,Q) is run. Then, MULTIPLE_QUERY_X_INTERVAL_HASH_TREE(Lcx($V_x$),Q) and MULTIPLE_QUERY_X_INTERVAL_HASH_TREE(Rcx($V_x$),Q) are run.

Otherwise, if $Qlx<Qrx<Xmid(V_x)$, then MULTIPLE_QUERY_Y_INTERVAL_HASH_TREE(Vy,Q) and MULTIPLE_QUERY_X_INTERVAL_HASH_TREE(Rcx($V_x$),Q) are run.

Otherwise, MULTIPLE_QUERY_Y_INTERVAL_HASH_TREE(Vy,Q) and MULTIPLE_QUERY_X_INTERVAL_HASH TREE(Rcx($V_x$),Q).

To run MULTIPLE_QUERY_INTERVAL_HASH_TREE(Vy,Q), it is determined if $Qay>Ymid(Vy)$ and $Qby<Ymid(Vy)$ and if so, then the list $L_{yabove}(BY)$ is walked along starting with the top-most endpoint, and the overlap of all intervals spanned by (Qlx,Qrx,Qay,Qby) is computed as follows.

Starting with the window with the topmost endpoint in the $L_{ybelow}(Vqy)$, all windows are reported that contain this end point as overlapping.

Then, report the above overlap for all query windows whose bottom-end points are below the current query end point.

Then, the above steps are repeated until all query bottom end points in $L_{ybelow}$ are exhausted.

Then, MULTIPLE_QUERY_Y_INTERVAL_HASH_TREE(Lcy(Vy),Q) and MULTIPLE_QUERY_Y_INTERVAL_HASH_TREE(Rcy(Vy),Q) are run.

If it is determined that $Qay>Qby>Ymid(Vy)$, then the $L_{yabove}(VY)$ is walked along starting at the interval with the top-most endpoint, and the overlap of all intervals spanned by (Qlx,Qrx,Qay,Qby) is computed as follows:

First, starting with the window with the topmost endpoint in the $L_{ybelow}(Vqy)$, all windows are reported that contain this end point as overlapping, and as soon as a window that does not contain this end point occurs, stopping at the last window.

Then, the above overlap is reported for all query windows whose bottom-end points are below the current query end point. Thereafter, MULTIPLE_QUERY_Y_INTERVAL_HASH_TREE(Lcy(Vy),Q) is run.

Otherwise (e.g., the query window is below Ymid), then the $L_{ybelow}(Vy)$ is walked along starting at the interval with the bottom-most endpoint, and the overlap of all intervals spanned by (Qlx,Qrx,Qay,Qby) is computed as follows:

Starting with the window with the bottom-most top-end point in the $L_{yabove}$ Vqy), all windows that contain this end point are reported as overlapping, and as soon as a window that does not contain this end point occurs, stopping at this window.

Then, the above overlap is reported for all query windows whose top-end points are above the current query end point, and MULTIPLE_QUERY_Y_INTERVAL_HASH_TREE(Rcy(Vy),Q) is run.

Thus if the x and y-interval trees at the current query node are designated by $V_{qx}$ and $V_{qy}$, then the order of exploration is $V_{qx}$->{$V_{qv}$, Lcy($V_{qy}$), Rcy($V_{qy}$)} followed by Lcx($V_{qx}$) and Rcx($V_{qx}$). For each such exploration against a database IHT node $V_d$, the bounding rectangle range (Qlx, Qrx, Qby, Qay) is used to determine which of the subareas to explore.

For example, if $Qlx<Xmid(V_{xd})<Qly$, then matching intervals can be found in either the y-interval tree under $V_{xd}$ i.e. $V_{yd}$, or the left and right subareas Lcx($V_{xd}$) and Rcx($V_d$) of $V_{xd}$. The algorithm for searching x-interval hash tree is reproduced above.

Specifically, it uses the range (Qby, Qay), and the relative placement of the median point of query y-interval tree Ymid($V_{qy}$) with respect to the median point Ymid($V_{yd}$) of the database node to decide the order of exploration.

For example if $Qby \leq Ymid(V_{xd}) \leq Qay$, and $I_{ymid}(Vqy)>I_{ymid}(Vyd)$, then by walking along Lybelow(Vqy) and Lyabove(Vyd) from their top-most end point, all database intervals can be reported that contain the current query end point. In addition, without further search, this overlap can be reported to hold for all query intervals in $V_{xq}$ whose bottom-end points are below the current query end point. This critical step avoids the repetitious search for multiple query intervals.

Figure 7E:
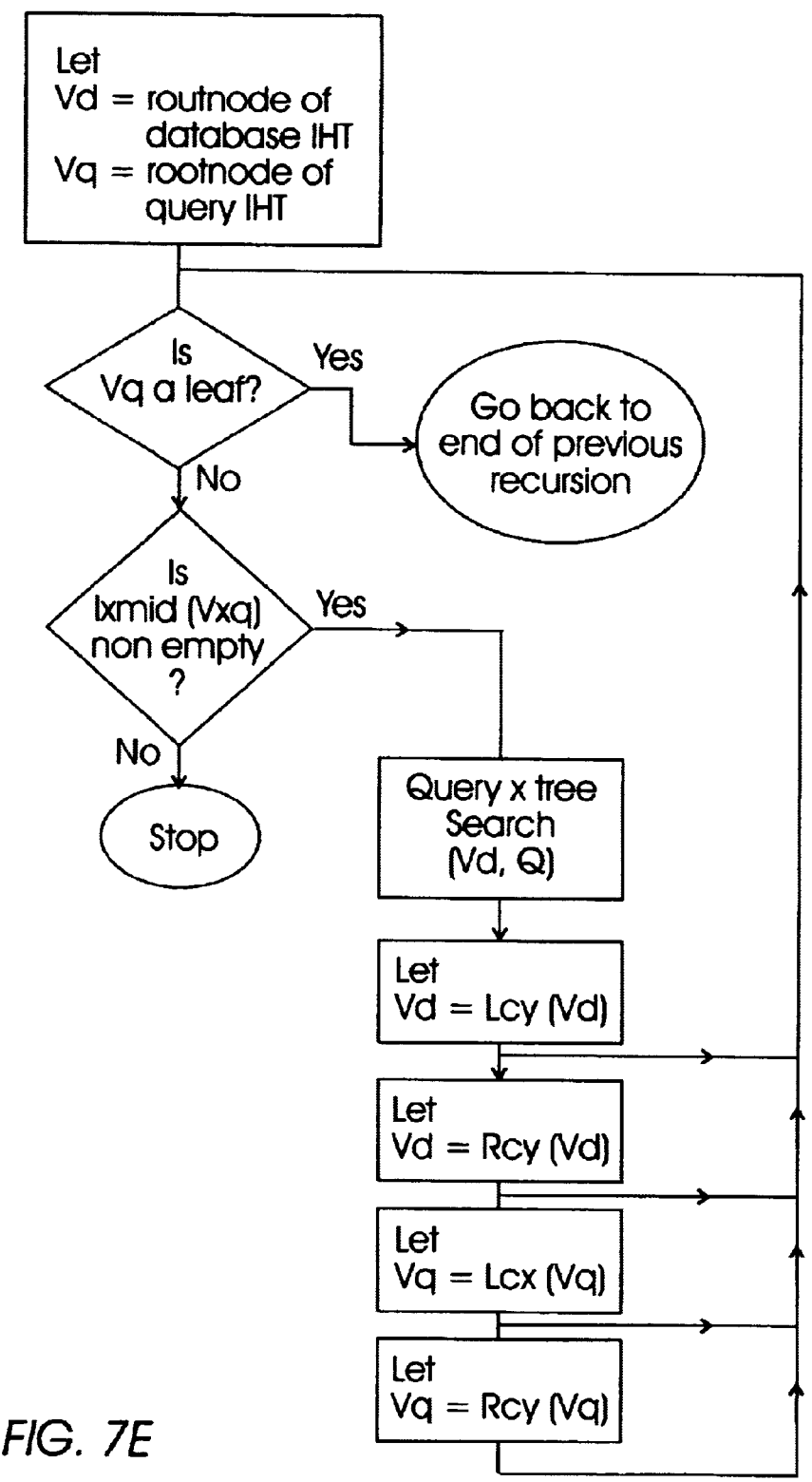
FIG. 7E illustrates a flowchart of a top-level search of query and data base interval hash trees.

FIG. 7C shows a flowchart of the multiple query y-interval hash tree step of searching for multiple query windows, whereas FIG. 7E shows a flowchart of a top-level search of query and data base interval hash trees.

Having thus described my invention, what I claim as new and desire to secure by Letters Patent is as follows:

1. A method of specifying the region layout of objects in an affine invariant manner as a set of affine intervals between pairs of regions, comprising:

representing database and query regions using affine intervals along with their region identity;

matching query region layout to layout of database image regions using an index structure; and retrieving relevant images of the database by hashing for dominant hit regions in the index structure.

2. The method of claim 1, wherein said hashing comprises color region hashing.

3. The method of claim 1, further comprising:

using a spatial layout representation to represent and localize said object in a pose-invariant manner.

4. The method of claim 1, further comprising:

extracting said regions using color for providing an illumination-invariant way of localizing colored objects.

5. The method of claim 1, further comprising:

using the index structure to consolidate affine interval information in the database.

6. The method of claim 1, further comprising:

using the index structure to avoid linearly searching through the database.

7. The method of claim 1, further comprising:

localizing 2-dimensional objects in an affine-invariant manner.

8. The method of claim 1, further comprising:

localizing 3-dimensional objects under limited pose changes in an affine-invariant manner.

9. The method of claim 1, further comprising:

extracting regions based on a feature other than color.

10. The method of claim 1, wherein said regions are extracted regardless of a presence of occlusions and noise in the region extraction based on built-in redundancy of said extracting.

11. A method of locating a multi-feature object in an image or video database, comprising:

extracting regions within the images containing a multi-feature query object;

using in combination the feature and geometric layout to localize the object in an illumination invariant and affine-invariant manner; and retrieving an image based on said localization of said object.

12. The method of claim 11, wherein said feature comprises color.

13. The method of claim 11, wherein said feature includes texture patterns.

14. The method of claim 11, wherein said object comprises any of a two-dimensional object and a three-dimensional object in two-dimensional data, said method further comprising:

locating two-dimensional and three-dimensional objects in two-dimensional data; and representing affine intervals using said data structure, said data structure comprising an interval hash tree.

15. The method of claim 14, further comprising:

indexing the interval hash tree; and recording the histogram of region hits.

16. The method of claim 11, wherein said features are extracted regardless of a presence of occlusions and noise in the feature extraction.

17. The method of claim 11, wherein a linear search of the database is avoided.

18. A system for specifying the region layout of objects in an affine invariant manner as a set of affine intervals between pairs of regions, comprising:

means for representing database and query regions using affine intervals along with their region identity;

means for matching query region layout to layout of database image regions using an index structure; and means for retrieving relevant images of the database by hashing for dominant hit regions in the index structure.

19. The system of claim 18, further comprising:

means for using a spatial layout representation to represent and localize said object in a pose-invariant manner.

20. The system of claim 18, further comprising:

means for extracting said regions using color for providing an illumination-invariant way of localizing colored objects.

21. The system of claim 18, further comprising:

means for using the index structure to consolidate affine interval information in the database.

22. The method of claim 18, further comprising:

means for using the index structure to avoid linearly searching through the database.

23. A system for locating a multi-feature object in an image or video database, comprising:

means for extracting regions within the images containing a multi-feature query object;

means for using in combination the feature and geometric layout to localize the object in an illumination invariant and affine-invariant manner; and means for retrieving an image based on said localization of said object.

24. A signal-bearing medium tangibly embodying a program of machine-readable instructions executable by a digital processing apparatus to perform a method of specifying the region layout of objects in an affine invariant manner as a set of affine intervals between pairs of regions, said method comprising:

representing database and query regions using affine intervals along with their region identity;

matching query region layout to layout of database image regions using an index structure; and retrieving relevant images of the database by hashing for dominant hit regions in the index structure.

25. A signal-bearing medium tangibly embodying a program of machine-readable instructions executable by a digital processing apparatus to perform a method of locating a multi-feature object in an image or video database, said method comprising:

extracting regions within the images containing a multi-feature query object;

using in combination the feature and geometric layout to localize the object in an illumination invariant and affine-invariant manner; and retrieving an image based on said localization of said object.

* * * * *